(12) United States Patent
Uno et al.

(10) Patent No.: US 10,155,864 B2
(45) Date of Patent: Dec. 18, 2018

(54) ALKOXYSILANE-MODIFIED POLYAMIC ACID SOLUTION, LAMINATE AND FLEXIBLE DEVICE USING SAME, POLYIMIDE FILM, AND PRODUCTION METHOD FOR LAMINATE

(71) Applicant: Kaneka Corporation, Osaka (JP)

(72) Inventors: Mari Uno, Shiga (JP); Etsuo Horii, Shiga (JP)

(73) Assignee: Kaneka Corporation (JP)

( * ) Notice: Subject to any disclaimer, the term of this patent is extended or adjusted under 35 U.S.C. 154(b) by 0 days.

(21) Appl. No.: 15/313,216

(22) PCT Filed: May 18, 2015

(86) PCT No.: PCT/JP2015/064189
§ 371 (c)(1),
(2) Date: Nov. 22, 2016

(87) PCT Pub. No.: WO2015/182419
PCT Pub. Date: Dec. 3, 2015

(65) Prior Publication Data
US 2017/0190910 A1    Jul. 6, 2017

(30) Foreign Application Priority Data

May 24, 2014   (JP) ................................ 2014-107619

(51) Int. Cl.
| | | |
|---|---|---|
| C08L 79/08 | (2006.01) | |
| B32B 9/00 | (2006.01) | |
| B32B 27/34 | (2006.01) | |
| C08G 73/10 | (2006.01) | |
| B29C 39/00 | (2006.01) | |
| B29C 39/02 | (2006.01) | |
| B29C 39/38 | (2006.01) | |
| B32B 17/06 | (2006.01) | |
| B32B 27/28 | (2006.01) | |
| C08J 5/18 | (2006.01) | |
| B29C 41/12 | (2006.01) | |
| B29K 79/00 | (2006.01) | |
| B29L 31/34 | (2006.01) | |

(52) U.S. Cl.
CPC ............ *C08L 79/08* (2013.01); *B29C 39/006* (2013.01); *B29C 39/026* (2013.01); *B29C 39/38* (2013.01); *B29C 41/12* (2013.01); *B32B 9/00* (2013.01); *B32B 17/064* (2013.01); *B32B 27/281* (2013.01); *B32B 27/34* (2013.01); *C08G 73/10* (2013.01); *C08G 73/106* (2013.01); *C08J 5/18* (2013.01); *B29K 2079/08* (2013.01); *B29K 2909/08* (2013.01); *B29K 2995/0082* (2013.01); *B29L 2031/3475* (2013.01); *B32B 2250/02* (2013.01); *B32B 2307/546* (2013.01); *B32B 2457/20* (2013.01); *C08J 2379/08* (2013.01); *C08L 2201/56* (2013.01); *C08L 2203/20* (2013.01)

(58) Field of Classification Search
None
See application file for complete search history.

(56) References Cited

U.S. PATENT DOCUMENTS

| | | | |
|---|---|---|---|
| 4,238,528 A | 12/1980 | Angelo et al. | |
| 4,672,099 A * | 6/1987 | Kunimune | ........... C08G 73/106 525/431 |
| 2006/0003173 A1* | 1/2006 | Usuki | ........................ B32B 7/12 428/458 |
| 2008/0261060 A1* | 10/2008 | Yamaguchi | ........... C08G 73/101 428/458 |
| 2009/0068454 A1* | 3/2009 | Murakami | ............... B32B 15/08 428/337 |
| 2011/0124806 A1* | 5/2011 | Simmons | ............ C08G 73/1042 524/600 |
| 2011/0213075 A1 | 9/2011 | Goshima et al. | |
| 2012/0097439 A1* | 4/2012 | Goshima | ............. C08G 73/1042 524/600 |
| 2013/0126860 A1* | 5/2013 | Fukuda | .................... C08L 79/08 257/43 |
| 2015/0368402 A1 | 12/2015 | Akinaga et al. | |

FOREIGN PATENT DOCUMENTS

| | | |
|---|---|---|
| JP | S554991 A | 1/1980 |
| JP | 2002121382 A | 4/2002 |
| JP | 2008266416 A | 11/2008 |
| JP | 2012035583 A | 2/2012 |
| KR | 20110098660 A | 9/2011 |
| WO | 2014073591 A1 | 5/2014 |
| WO | 2014123045 A1 | 8/2014 |

OTHER PUBLICATIONS

International Search Report for Application No. PCT/JP2015/064189 dated Aug. 4, 2015.
International Preliminary Report on Patentability for Application No. PCT/JP2015/064189 dated Dec. 8, 2016.

* cited by examiner

*Primary Examiner* — Tahseen Khan
(74) *Attorney, Agent, or Firm* — Lerner, David, Littenberg, Krumholz & Mentlik, LLP

(57) ABSTRACT

The present invention has an object to obtain a polyimide film that has a sufficiently smooth surface without peeling even in a case where the polyimide film is a thick film and that is excellent in adhesion to an inorganic substrate. An alkoxysilane-modified polyamic acid solution of the present invention contains: an alkoxysilane-modified polyamic acid; and a surface control agent, the alkoxysilane-modified polyamic acid solution having a specific viscosity, the alkoxysilane-modified polyamic acid being obtained by reacting a polyamic acid with an alkoxysilane compound containing an amino group, and the polyamic acid being obtained by reacting a diamine with a tetracarboxylic dianhydride.

11 Claims, 1 Drawing Sheet

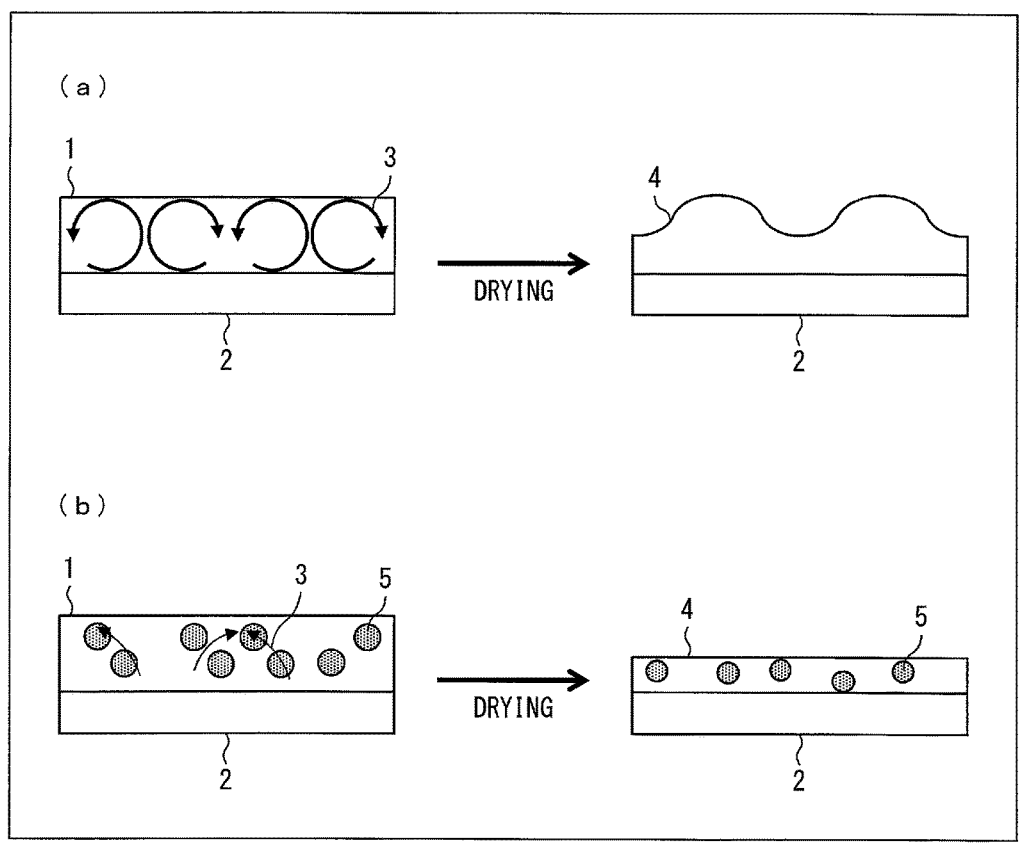

ALKOXYSILANE-MODIFIED POLYAMIC ACID SOLUTION, LAMINATE AND FLEXIBLE DEVICE USING SAME, POLYIMIDE FILM, AND PRODUCTION METHOD FOR LAMINATE

CROSS-REFERENCE TO RELATED APPLICATION

This application is a national phase entry under 35 U.S.C. § 371 of International Application No. PCT/JP2015/064189, filed on May 18, 2015, published in Japanese, which claims priority to Japan Patent Application No. 2014-107619, filed on May 24, 2014, the disclosures of which are incorporated herein by reference.

TECHNICAL FIELD

The present invention relates to an alkoxysilane-modified polyamic acid solution, a laminate and a flexible device each produced by use of the alkoxysilane-modified polyamic acid solution, a method for producing a polyimide film, and a method for producing the laminate.

BACKGROUND ART

Currently, a glass substrate is mainly used as a substrate in the field of electronic devices such as a flat panel display and electronic paper. However, a glass substrate is disadvantageously heavy and brittle. Thus, a glass substrate is not always an ideal substrate. On this account, studies have been actively made so as to provide a flexible device in which a substrate made of glass is replaced by a substrate made of a polymer material. However, many of techniques for providing such a flexible device require new production techniques and apparatuses. Accordingly, a flexible device in which a polymer material is used has not yet been mass-produced.

Meanwhile, recently, there has been proposed, as a shortcut to efficient mass production of flexible devices, a method for producing a flexible device in accordance with an ordinary process for producing a glass substrate and by use of a laminate in which a polyimide resin layer is provided on a glass substrate. According to the process in which the laminate is used, the flexible device is obtained by separating the polyimide resin layer from the glass substrate in a final step.

In the process, the laminate is required to have smoothness and low warpage so as to be favorably handled. In other words, the polyimide film layer of the laminate is required to have a sufficiently smooth surface and a coefficient of linear thermal expansion which coefficient is substantially equal to that of glass. Note that soda-lime glass and alkali-free glass, each of which is generally used for a glass substrate, have respective coefficients of linear thermal expansion of approximately 8 ppm/° C. to 9 ppm/° C. and approximately 3 ppm/° C. to 5 ppm/° C. Further, a processing temperature during production of an amorphous silicon thin film transistor reaches 300° C. to 350° C. at maximum. A material suitable for such a process is inevitably limited. This is because a coefficient of linear thermal expansion of a general polyimide is greater than that of glass. For example, Patent Literature 1 discloses a method in which a laminate is obtained by (i) casting, on an inorganic substrate, a solution of a polyimide precursor obtained from (a) 3,3',4,4'-biphenyltetracarboxylic dianhydride and (b) para-phenylene diamine, 4,4''-diaminoparaterphenyl, and the like and (ii) subjecting the solution to thermal imidization.

Patent Literature 2 discloses a polyimide precursor composition in which a solvent that has a boiling point of 160° C. or lower and is useful for production of electrical and electronic materials such as a semiconductor device and a multilayer circuit board is dissolved in a solvent that accounts for 30% or more of a total solvent weight. The polyimide precursor composition contains a surfactant so that nonuniformity in thickness less occurs in a coated film. The polyimide precursor composition also contains an organosilicon compound as an adhesive assistant so that a heat-treated polyimide coated film and a substrate more strongly adhere to each other.

Patent Literature 3 discloses an alkoxysilane-modified polyamic acid solution obtained by reacting an amino group-containing alkoxysilane compound with a polyamic acid in a solution. Patent Literature 3 also discloses (i) that the polyamic acid is obtained by reaction between an aromatic diamine and an aromatic tetracarboxylic dianhydride and (ii) that a molar ratio obtained by dividing a total number of moles of the aromatic tetracarboxylic dianhydride by a total number of moles of the aromatic diamine falls within a specific range.

CITATION LIST

Patent Literatures

[Patent Literature 1]
Japanese Patent Application Publication, Tokukai, No. 2012-35583 (Publication date: Feb. 23, 2012)
[Patent Literature 2]
Japanese Patent Application Publication, Tokukai, No. 2002-121382 (Publication date: Apr. 23, 2002)
[Patent Literature 3]
Pamphlet of International Publication No. 2014/123045 (Publication date: Aug. 14, 2014)

SUMMARY OF INVENTION

Technical Problem

Such a polyimide precursor as disclosed in Patent Literature 1 is less thermally expandable and has a specific structure. Assume that while being formed into a polyimide film on an inorganic substrate, the polyimide precursor is imidized by being heated by increasing a temperature at a certain rate or higher. In this case, the polyimide film may be peeled from the substrate. Thus, there is room for further improvement in adhesion between the substrate and the polyimide film. In general, in a case where a film before imidization is thicker, a resultant film is more likely to be peeled from the substrate. This makes it difficult to improve productivity in a case where a laminate including a thick polyimide film and glass is produced.

According to Patent Literature 2, a polyimide precursor contains a surfactant so that a coated film can have a uniform thickness. Note, however, that Patent Literature 2 does not consider adhesion between the coated film and the substrate. Further, a polyamic acid of Patent Literature 2 differs from that of the present invention in application and thus has a low viscosity, so that Patent Literature 2 differs from the present invention in viscosity range.

In addition, according to such a conventional technique as described earlier, in order to form a film having a smooth surface, it may be necessary to start drying at a low temperature (e.g., 80° C. or lower) in forming the polyimide precursor into a film. This causes the following problem.

Specifically, since it is impossible to start drying at a high temperature, it takes a long time to cool, for example, an oven that is heated by the batch, so that a film-forming time is made longer during mass production of films.

The present invention has been made in view of the above background, and an object of the present invention is to provide a polyamic acid solution that makes it possible (i) to form a polyimide film that has a sufficiently smooth surface without peeling even in a case where drying is started at a high temperature and/or in a case where the polyimide film is a thick film having a thickness of approximately 20 μm and (ii) to obtain a polyimide film that is excellent in adhesion to an inorganic substrate. Another object of the present invention is to provide a laminate including an inorganic substrate and a polyimide film being suitably usable for production of a flexible device, specifically a laminate including an inorganic substrate and a polyimide film having a coefficient of linear thermal expansion of 20 ppm/° C. or less.

Solution to Problem

An arrangement of the present invention is described below.

An alkoxysilane-modified polyamic acid solution containing: an alkoxysilane-modified polyamic acid; and a surface control agent, the alkoxysilane-modified polyamic acid solution having a viscosity of 1,200 mPa·s to 20,000 mPa·s, the alkoxysilane-modified polyamic acid being obtained by reacting, in a polyamic acid solution, a polyamic acid with an alkoxysilane compound containing an amino group, and the polyamic acid being obtained by reacting a diamine with a tetracarboxylic dianhydride.

Advantageous Effects of Invention

According to the present invention, since an alkoxysilane-modified polyamic acid solution containing a surface control agent is used, a polyimide film prepared by casting the alkoxysilane-modified polyamic acid solution on an inorganic substrate and heating the alkoxysilane-modified polyamic acid solution (i) has a coefficient of linear thermal expansion of 20 ppm/° C. or less, (ii) has a highly smooth surface even in a case where drying is started at a high temperature, and can more strongly adhere to the inorganic substrate.

BRIEF DESCRIPTION OF DRAWINGS

FIG. 1 schematically illustrates a state of an alkoxysilane-modified polyamic acid solution that has been cast on an inorganic substrate.

DESCRIPTION OF EMBODIMENTS

The following discusses the present invention in detail. Note, however, that the following is merely an aspect of the present invention and the present invention is not limited thereto. Note that the wording "A to B" indicative of a numerical range means "A or more and B or less" unless otherwise specifically mentioned.

<Alkoxysilane-Modified Polyamic Acid Solution>

An alkoxysilane-modified polyamic acid solution of the present invention contains a surface control agent and an alkoxysilane-modified polyamic acid. By containing the surface control agent, the alkoxysilane-modified polyamic acid of the present invention makes it possible to obtain a polyimide film excellent in adhesion to an inorganic substrate and in surface property even in a case where drying is started at a high temperature.

First, the alkoxysilane-modified polyamic acid is described below. The alkoxysilane-modified polyamic acid is obtained by reacting, in a solution, (a) an alkoxysilane compound containing an amino group with (b) a polyamic acid. Further, the polyamic acid is obtained by reacting, in a solvent, a diamine with a tetracarboxylic dianhydride. Ingredients of the polyamic acid and a method for polymerizing the polyamic acid will be described later. Note that the alkoxysilane-modified polyamic acid is herein also referred to as "a solid content in an alkoxysilane-modified polyamic acid solution". Note also that a concentration of the solid content in the alkoxysilane-modified polyamic acid solution may also be merely referred to as "a solid content concentration".

Modification with the alkoxysilane compound containing the amino group is carried out by adding (a) the alkoxysilane compound containing the amino group to (b) a polyamic acid solution obtained by dissolving the polyamic acid in a solvent, and reacting (a) the alkoxysilane compound with (b) the polyamic acid solution. Examples of the alkoxysilane compound containing the amino group encompass 3-aminopropyl trimethoxysilane, 3-aminopropyl triethoxysilane, 3-aminopropyl methyl dimethoxysilane, 3-aminopropyl methyl diethoxysilane, 3-(2-aminoethyl)aminopropyl trimethoxysilane, 3-phenylaminopropyl trimethoxysilane, 2-aminophenyl trimethoxysilane, 3-aminophenyl trimethoxysilane, and the like.

The alkoxysilane compound was mixed in a ratio preferably of 0.01 parts by weight to 0.50 parts by weight, more preferably of 0.01 parts by weight to 0.10 parts by weight, and still more preferably of 0.01 parts by weight to 0.05 parts by weight, with respect to 100 parts by weight of the polyamic acid. The alkoxysilane compound which is mixed in a ratio of 0.01 parts by weight or more makes it possible to yield an effect that is sufficient to prevent a resultant film from being peeled from the inorganic substrate. Meanwhile, the alkoxysilane compound which is mixed in a ratio of 0.50 parts by weight or less allows a sufficient molecular weight of the polyamic acid to be maintained. This prevents a problem of embrittlement or the like of a resultant film.

In a case where the alkoxysilane compound containing the amino group is added to a polyamic acid whose terminals are mostly amino groups, the polyamic acid solution decreases in viscosity. Inventors of the present invention infer that such a decrease in viscosity occurs for the following reason. That is, as modification reaction proceeds in response to reaction between (a) an acid anhydride group that is reproduced in response to dissociation of an amide bond contained in the polyamic acid and (b) an amino group of the alkoxysilane compound, the polyamic acid decreases in molecular weight. A reaction temperature is preferably 0° C. or higher and 80° C. or lower, and more preferably 20° C. or higher and 60° C. or lower so that alkoxysilane modification reaction easily proceeds while reaction between the acid anhydride group and water is prevented. In a case where a different kind of the polyamic acid and/or a different solvent are/is employed, it is only necessary to select an appropriate reaction condition by recording a change in viscosity for each time for each reaction temperature.

By thus modifying some of the terminals of the polyamic acid with alkoxysilane, it is possible to prevent peel-off (delamination, foaming) of a polyimide film during heating in a case where the polyamic acid solution is applied to the inorganic substrate. Further, by adjusting the polyamic acid so that the terminals thereof are mostly amino groups, an amide bond is easily formed also in a case where decomposition of the polyamic acid occurs. As a result, the molecular weight is less likely to change, and consequently, a change in viscosity during storage of the alkoxysilane-modified polyamic acid solution can be prevented.

A solvent that is used to produce the alkoxysilane-modified polyamic acid is not particularly limited to any specific solvent, and a solvent used to produce the polyamic acid can be used as that solvent as it is. The solvent can be appropriately removed or added during the production of the alkoxysilane-modified polyamic acid. Further, the alkoxysilane-modified polyamic acid obtained as described earlier can be used, as it is, as the alkoxysilane-modified polyamic acid solution, which is an end product, provided that the alkoxysilane-modified polyamic acid is a solution in which a main solvent of a reaction solution is an amide solvent. The alkoxysilane-modified polyamic acid can be appropriately removed or added.

According to the present invention, a main solvent of the alkoxysilane-modified polyamic acid solution, which is an end product, is preferably an amide solvent. Note here that the main solvent refers to a solvent that has a greatest weight of all solvents contained in a solution. That is, "a main solvent is an amide solvent" means that a total weight of the amide solvent is greater than a weight of each of solvents that are contained in a solution and are different from the amide solvent. From the viewpoint of adhesion, the alkoxysilane-modified polyamic acid solution of the present invention contains, of all solvents, the amide solvent in an amount preferably of 90 weight % or more, more preferably of 95 weight % or more, and still more preferably of 98 weight % or more. Examples of the amide solvent which can be used in the alkoxysilane-modified polyamic acid solution encompass N,N-dimethylformamide, N,N-dimethylacetamide, N-methyl-2-pyrolidone, and the like. Of these amide solvents, two or more kinds can be mixed. Examples of a solvent different from the amide solvent encompass dimethylsulfoxide, hexamethylphosphoramide, acetonitrile, acetone, tetrahydrofuran, and the like.

During a process for producing a polyimide film by casting the alkoxysilane-modified polyamic acid solution on a substrate and imidizing the alkoxysilane-modified polyamic acid solution, a solvent preferably has a boiling point of 150° C. or higher in that such a solvent does not cause a defect such as whitening of the polyimide film due to volatilization of the solvent. Further, two or more kinds of solvents can be mixed to be used, and 4-methyl2-pentanone, xylene, toluene, benzene, diethylene glycol ethyl ether, diethylene glycol dimethyl ether, 1,2-bis-(2-methoxyethoxy)ethane, bis(2-methoxyethyl)ether, butylcellosolve, butylcellosolve acetate, propyleneglycol methyl ether, propyleneglycol methyl ether acetate, and the like can be used in combination.

The alkoxysilane-modified polyamic acid solution has a viscosity of 1,200 mPa·s to 20,000 mPa·s, preferably of 2,000 mPa·s to 15,000 mPa·s, and more preferably of 3,000 m Pa·s to 14,000 mPa·s. The alkoxysilane-modified polyamic acid solution which has a viscosity of 1,200 mPa·s or more makes it possible to achieve a sufficiently accurate film thickness. Further, the alkoxysilane-modified polyamic acid solution which has a viscosity of 20,000 mPa·s or less makes it possible to prevent (i) a deterioration in handling and (ii) gelling. A viscosity is measured by use of Viscometer RE-215/U (manufactured by Toki Sangyo Co., Ltd.) and in accordance with a method described in JIS K7117-2: 1999. An accessory thermostat is set at 23.0° C., and a measurement temperature is adjusted so as to be constant at all times.

The alkoxysilane-modified polyamic acid solution of the present invention contains the surface control agent. FIG. 1 schematically illustrates a state of an alkoxysilane-modified polyamic acid solution that has been cast on an inorganic substrate. According to a conventional technique, in a case where nonuniform surface tension derived from temperature variation is caused during drying, asperities may be formed on a surface of a polyimide film 4 after drying (see (a) of FIG. 1). This seems to be because a convection current 3 is generated in an alkoxysilane-modified polyamic acid solution 1 which has been cast on an inorganic substrate 2. The convection current is generated due to a low viscosity of the alkoxysilane-modified polyamic acid solution 1 and a high boiling point of a solvent.

A convection current which may cause asperities on a surface can be prevented by (i) making a film thickness thinner (this is related to an increase in solid content concentration), (ii) increasing a viscosity, (iii) making a temperature difference in a coated film smaller, (iv) preventing nonuniform surface tension due to a temperature difference, and/or (v) the like.

Note here that a change in film thickness and viscosity may affect a quality of a polyimide film. Note also that the temperature difference in a coated film needs to be made smaller by drying at a low temperature, well-designing of drying equipment, and/or the like. Drying carried out at a low temperature can make a production time longer. In view of this, the surface control agent is used in the present invention so that uniform surface tension is achieved even in a case where a temperature difference occurs in a coated film during drying.

(b) of FIG. 1 illustrates a case where the alkoxysilane-modified polyamic acid solution of the present invention is cast. Since the alkoxysilane-modified polyamic acid solution 1 of the present invention contains a surface control agent 5, a difference in surface tension is made smaller, so that the convection current 3 is prevented. As a result, the present invention allows the surface of the polyimide film 4 to be smooth after drying. The present invention thus makes it possible to provide a polyimide film that has a smooth surface even in a case where drying is started at a high temperature.

Surprisingly, the inventors of the present invention found that use of a surface control agent not only allows a polyimide film to have a smooth surface but also allows the polyimide film to more strongly adhere to an inorganic substrate.

Examples of the surface control agent encompass a silicone compound, a fluorine compound, a vinyl compound, an acrylic compound, and the like. The surface control agent is preferably an acrylic compound or a silicone compound in that no toxic substance is generated while the acrylic compound or the silicone compound is being heated at a high temperature. Further, the surface control agent is particularly preferably an acrylic compound in that the acrylic compound is highly recoatable (stackable). In addition, a surface control agent that is moderately compatible with a resin and has an excellent defoaming property is more preferably selected from the above surface control agents in accordance with a polarity and a molecular weight thereof.

Specific examples of a surface control agent containing an acrylic compound encompass DISPARLON LF-1980, LF-1983, and LF-1985 (each manufactured by Kusumoto Chemicals, Ltd.), BYK-3440, BYK-3441, BYK-350, and BYK-361N (each manufactured by BYK Japan KK), and the like. Examples of a surface control agent containing a silicone compound as a main component encompass KP-112 (manufactured by Shin-Etsu Chemical Co., Ltd.), L-7001 and L-7002 (each manufactured by Dow Corning Toray Co., Ltd.), and the like.

The surface control agent is added in an amount preferably of 0.0001 parts by weight or more and 0.1 parts by weight or less, more preferably of 0.0005 parts by weight or more and 0.1 parts by weight or less, particularly preferably of 0.001 parts by weight or more and 0.05 parts by weight or less, and extremely preferably of 0.005 parts by weight or more and 0.02 parts by weight or less, with respect to 100 parts by weight of the alkoxysilane-modified polyamic acid. The surface control agent which is added in an amount of 0.0001 parts by weight or more is preferable because such a surface control agent yields an effect that is sufficient for a polyimide film to have a smoother surface. The surface control agent which is added in an amount of 0.1 parts by weight or less is preferable because such a surface control agent is less likely to cause a polyimide film to be turbid. Note that the surface control agent herein encompasses an additive that normally carries out a function of adjusting a surface property of a film, and also encompasses a surfactant, a leveling agent, a defoaming agent, and the like. The surface control agent can be added to the alkoxysilane-modified polyamic acid solution as it is or after being diluted with a solvent. The surface control agent can be added at any time that is not particularly limited, provided that the surface control agent is contained in the alkoxysilane-modified polyamic acid solution, which is an end product. For example, the surface control agent can be added while the polyamic acid is being produced, while the polyamic acid is being modified with alkoxysilane, or after the modification is finished. The alkoxysilane-modified polyamic acid solution of the present invention can be partially imidized provided that a property thereof is not affected.

<Ingredients of Polyamic Acid>

As described earlier, as the ingredients of the polyamic acid, a tetracarboxylic dianhydride component and a diamine component are employed.

As the tetracarboxylic dianhydride component, which is not particularly limited, it is preferable to use an aromatic tetracarboxylic dianhydride. In order to obtain a laminate including an inorganic substrate and a polyimide film having a coefficient of linear thermal expansion of 1 ppm/° C. to 20 ppm/° C., it is preferable to principally employ, as the tetracarboxylic dianhydride component, 3,3',4,4'-biphenyltetracarboxylic dianhydride (hereinafter, may also be abbreviated as "BPDA"), whereas it is particularly preferable to principally employ, as the diamine component, a diamine represented by the following formula (1):

[Chem. 1]

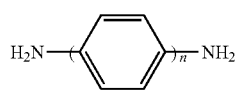

(1)

wherein n is any integer of 1 to 3.

The diamine represented by the above formula (1) encompasses paraphenylene diamine (hereinafter may also be abbreviated as "PDA"), 4,4'-diamino benzidine, and 4,4''-diamino paraterphenyl (hereinafter may also be abbreviated as "DATP"). Among these diamines, PDA and DATP are preferable in view of availability.

The tetracarboxylic dianhydride is preferably 3,3',4,4'-biphenyltetracarboxylic dianhydride. By using an alkoxysilane-modified polyamic acid solution containing (a) 3,3',4,4'-biphenyltetracarboxylic dianhydride and (b) as the diamine, a diamine which is highly stiff, such as paraphenylene diamine, it is possible to impart a more suitable property such as low thermal expandability to a flexible device substrate.

Further, a diamine different from PDA, 4,4'-diamino benzidine, and DATP, and a tetracarboxylic dianhydride different from 3,3',4,4'-biphenyltetracarboxylic dianhydride can be used, provided that no property of the present invention is lost by the diamine and the tetracarboxylic dianhydride. For example, 5 mol % or less of any of the following tetracarboxylic dianhydrides and 5 mol % or less of any of the following diamines can be used in combination with respect to all the ingredients of the polyamic acid.

Examples of the tetracarboxylic dianhydride encompass pyromellitic dianhydride, 3,3',4,4'-benzophenone tetracarboxylic dianhydride, 2,3,3',4'-biphenyltetracarboxylic dianhydride, 3,3',4,4'-diphenyl sulfone tetracarboxylic dianhydride, 1,4,5,8-naphthalene tetracarboxylic dianhydride, 2,3,6,7-naphthalene tetracarboxylic dianhydride, 1,2,5,6-naphthalene tetracarboxylic dianhydride, 4,4'-oxydiphthalic anhydride, 9,9-bis(3,4-dicarboxyphenyl)fluorene dianhydride, 9,9'-bis[4-(3,4-dicarboxyphenoxy)phenyl]fluorene dianhydride, 3,3',4,4'-biphenylether tetracarboxylic dianhydride, 2,3,5,6-pyridine tetracarboxylic dianhydride, 3,4,9,10-perylene tetracarboxylic dianhydride, 4,4'-sulfonyl diphthalic dianhydride, paraterphenyl-3,4,3',4'-tetracarboxylic dianhydride, metaterphenyl-3,3',4,4'-tetracarboxylic dianhydride, 3,3',4,4'-diphenylether tetracarboxylic dianhydride, and the like. Each of the above tetracarboxylic dianhydrides can have an aromatic ring having an alkyl-substituted portion and/or a halogen-substituted portion.

Examples of the diamine encompass 4,4'-diamino diphenyl ether, 3,4'-diamino diphenyl ether, 4,4'-diamino diphenyl sulfone, 1,5-(4-aminophenoxy)pentane, 1,3-bis(4-aminophenoxy)-2,2-dimethylpropane, 2,2-bis(4-aminophenoxyphenyl)propane, bis[4-(4-aminophenoxy)phenyl]sulfone, bis[4-(3-aminophenoxy)phenyl]sulfone, 9,9-bis(aminophenyl)fluorene, and the like.

<Method for Polymerizing Polyamic Acid>

The polyamic acid used in the present invention can be produced by solution polymerization. Specifically, the polyamic acid which is a polyamide precursor is obtained by reacting, in a solvent, one or more kinds of tetracarboxylic dianhydride component(s) used as ingredient(s) with one or more kinds of diamine components used as ingredient(s).

In order to improve storage stability, the polyamic acid used in the present invention preferably has terminals that are occupied by an amino group in a higher ratio than by a carboxyl group. Specifically, a molar ratio obtained by dividing a total number of moles of the tetracarboxylic dianhydride by a total number of moles of the diamine is preferably 0.980 or more and less than 1.000, and more preferably 0.995 or more and 0.998 or less. In a case where the molar ratio obtained by dividing a total number of moles of the tetracarboxylic dianhydride by a total number of moles of the diamine is set to be less than 1.000, polyamic acid terminals are occupied by an amino group in a higher ratio than by an acid anhydride group. This makes it possible to improve storage stability. Meanwhile, in order to obtain a strong polyimide film, it is necessary to sufficiently increase a molecular weight by setting the molar ratio obtained by dividing a total number of moles of the tetracarboxylic dianhydride by a total number of moles of the diamine to be closer to 1.000. In a case where the molar ratio obtained by dividing a total number of moles of the tetracarboxylic dianhydride by a total number of moles of the diamine is 0.980 or more, it is possible to obtain a strong polyimide film.

A solvent that is favorable for synthesis of the polyamic acid only needs to be a solvent that is normally used to synthesize a polyamic acid, and is preferably an amide solvent in that the amide solvent is excellent in solubility of a polyamic acid and an ingredient for synthesizing the polyamic acid. The amide solvent of the present invention means an organic solvent that has an amide structure. Examples of the amide solvent encompass N,N-dimethylformamide, N,N-dimethylacetamide, N-methyl-2-pyrolidone, N,N-dimethylamide isobutyrate, 1-ethyl-2-pyrrolidone, 1,3-dimethyl-2-imidazolidinone, 3-methoxy-N,N-dimethyl propion amide, and the like. Use of a solvent that is appropriately selected from the above solvents makes it possible to control a property of the polyamic acid solution and a property of the polyimide film obtained after imidization of the polyamic acid solution on an inorganic substrate. According to the present invention, the alkoxysilane-modified polyamic acid solution, which is an end product, preferably contains the amide solvent from the viewpoint of adhesion between the polyimide film and the substrate. Thus, in order to facilitate reaction, it is preferable to use the amide solvent as a main solvent also to synthesize the polyamic acid.

A reaction apparatus that is used to polymerize the polyamic acid preferably includes a temperature control device for controlling a reaction temperature. It is preferable that the polyamic acid be polymerized at a reaction temperature preferably of 0° C. or higher and 80° C. or lower, and more preferably of 20° C. or higher and 60° C. or lower. This is because at such a reaction temperature, dissociation, which is a reverse reaction of polymerization, of an amide bond is prevented, a production reaction of the polyamic acid easily progresses, and a viscosity of the polyamic acid easily increases. Further, a heat treatment can be carried out at a temperature of approximately 70° C. to 90° C. for 1 hour to 24 hours after the polymerization so that the viscosity, i.e., the molecular weight is adjusted. The heat treatment is an operation conventionally called "cooking". The heat treatment is carried out so that (i) dissociation of an amic acid and deactivation of an acid anhydride by reaction with water in a system are promoted and (ii) the viscosity of the polyamic acid solution is set at a level suitable for a subsequent operation. It is preferable to separately carry out the polymerization reaction and the cooking. This is because an unreacted tetracarboxylic dianhydride is easily deactivated by separately carrying out the polymerization reaction and the cooking. Note, however, that the polymerization and the cooking can also be carried out together by setting a reaction temperature in a range of 70° C. to 90° C. from the beginning.

As to an amount in weight % of the polyamic acid contained in the polyamic acid solution, the polyamic acid is dissolved in a solvent preferably of 5 weight % to 30 weight %, more preferably of 8 weight % to 25 weight %, and still more preferably of 10 weight % to 20 weight %. In a case where the polyamic acid is contained in the polyamic acid solution at such a concentration, gelatification caused by abnormal polymerization of undissolved ingredient(s) is prevented and the production reaction of the polyamic acid easily progresses. Thus, the polyamic acid is preferably contained in the polyamic acid solution at the above concentration.

In a case where terminals of the polyamic acid thus obtained are partially modified with alkoxysilane by the method described earlier, the alkoxysilane-modified polyamic acid can be obtained.

<Aftertreatment of Surface Control Agent-Containing Alkoxysilane-Modified Polyamic Acid Solution>

The alkoxysilane-modified polyamic acid solution obtained as described earlier is appropriately subjected to a filtration treatment so that foreign matter is reduced. A filter for use in filtration is not particularly limited provided that a solution to be filtered does not impair a material of which the filter is made. It is possible to appropriately select, as the filter, a filter that is made of a suitable material. The filter can have a pore size, which is selected in accordance with a purpose and is not particularly limited, preferably of 0.01 μm to 3 μm, and more preferably of 0.1 μm to 1 μm. According to need, the filtration can be repeatedly carried out, or two or more kinds of filters can be used in combination to be subjected to multistage filtration.

The filtration of the surface control agent-containing alkoxysilane-modified polyamic acid solution allows a smaller amount of foreign matter to be contained in the surface control agent-containing alkoxysilane-modified polyamic acid solution. As to an amount of the foreign matter contained in the surface control agent-containing alkoxysilane-modified polyamic acid solution, foreign matter having a size of 0.5 μm or more is contained in the surface control agent-containing alkoxysilane-modified polyamic acid solution in an amount, measured by use of a light scattering in-liquid particle counter, preferably of 100 pieces/g or smaller, and more preferably of 50 pieces/g or smaller.

Note that the filtration is preferably carried out by adjusting a contained amount of the surface control agent in advance in view of the fact that the surface control agent is partially removed by the filtration. In a case where the filtration is carried out, the surface control agent is contained in an amount preferably of 0.02 parts by weight or more, and more preferably of 0.05 parts by weight or more. For example, in a case where the alkoxysilane-modified polyamic acid solution which has been subjected to the filtration starts to be dried at 120° C., the surface control agent is contained in an amount preferably of 0.02 parts by weight or more. Meanwhile, in a case where the alkoxysilane-modified polyamic acid solution which has been subjected to the filtration starts to be dried at 150° C., the surface control agent is contained in an amount preferably of 0.05 parts by weight or more.

<Casting and Thermal Imidization of Alkoxysilane-Modified Polyamic Acid Solution>

A laminate including a polyimide film and an inorganic substrate can be produced by casting the alkoxysilane-modified polyamic acid solution (described earlier) on an inorganic substrate, and heating and imidizing the alkoxysilane-modified polyamic acid solution.

The inorganic substrate, which is exemplified by glass substrates and various metal substrates, is preferably a glass substrate. For the glass substrate, soda-lime glass, borosilicate glass, alkali-free glass, or the like is used. In particular, the inorganic substrate is more preferably made of alkali-free glass, which is generally used in a production process of a thin film transistor. An inorganic substrate to be used preferably has a thickness of 0.4 mm to 5.0 mm. The inorganic substrate which has a thickness of 0.4 mm or more is preferable because such an inorganic substrate can be easily handled. Meanwhile, the inorganic substrate which has a thickness of 5.0 mm or less is preferable because such an inorganic substrate has a smaller thermal capacity and thus allows higher productivity in a heating or cooling step.

The alkoxysilane-modified polyamic acid solution can be cast by any publicly known method. Examples of such a publicly known casting method encompass a gravure coating method, a spin coating method, a silk screening method, a dip coating method, a bar coating method, a knife coating method, a roll coating method, a die coating method, and the like.

A heating temperature and a heating time, each of which can be appropriately determined so that a polyimide film is obtained by heating and imidizing the alkoxysilane-modified polyamic acid solution, are not particularly limited provided that neither the heating temperature nor the heating time affects a property of the polyimide film. The following description shows examples of the heating temperature and the heating time.

First, the alkoxysilane-modified polyamic acid solution which is cast on an inorganic substrate is preferably subjected to heating at 60° C. to 200° C. for 3 minutes to 120 minutes. In this case, heating is started at a temperature of 100° C. to 150° C. from the viewpoint of enhancement of production efficiency of a laminate including a polyimide film and the inorganic substrate. Further, from the viewpoint of exhibition of low thermal expandability, it is particularly preferable that heating be started at a temperature of 110° C. to 130° C. and carried out at this temperature for 10 minutes to 60 minutes. The temperature at which heating is started is, i.e., a drying starting temperature. Drying can be carried out at two-stage temperatures (e.g., at 100° C. for 30 minutes and subsequently at 120° C. for 30 minutes).

Next, heating is carried out at a temperature of 200° C. to 500° C. for 3 minutes to 300 minutes so that imidization proceeds. In this case, the temperature is preferably gradually increased from a low temperature to a high temperature so as to reach a maximum temperature. The temperature is preferably increased at a rate of 2° C./min to 10° C./min, and the maximum temperature preferably falls within a range of 300° C. to 500° C. The maximum temperature which is 300° C. or higher is preferable because such a maximum temperature allows thermal imidization to sufficiently proceed. Meanwhile, the maximum temperature which is 500° C. or lower is preferable because such a maximum temperature makes it possible to prevent thermal degradation of polyimide. Further, the temperature can be maintained at any temperature for any time before reaching the maximum temperature.

Heating can be carried out in an air atmosphere, under reduced pressure, or in an atmosphere of an inactive gas such as nitrogen. Further, heating can be carried out by use of a heating device that is exemplified by a publicly known device such as a hot-air oven, an infrared oven, a vacuum oven, an inert oven, or a hot plate.

The alkoxysilane-modified polyamic acid solution of the present invention can be heated and imidized after an imidization catalyst is appropriately added thereto. The imidization catalyst is preferably a tertiary amine. The tertiary amine is more preferably a heterocyclic tertiary amine. The heterocyclic tertiary amine is preferably specifically exemplified by pyridine, 2,5-diethylpyridine, picoline, quinoline, isoquinoline, and the like. The imidization catalyst is used in an amount preferably of 0.01 equivalents to 2.00 equivalents, and particularly preferably of 0.02 equivalents to 1.20 equivalents, with respect to a reacted portion of the alkoxysilane-modified polyamic acid. The imidization catalyst which is used in an amount of 0.01 equivalents or more is preferable because the imidization catalyst which is used in such an amount makes it possible to obtain a sufficient effect of the imidization catalyst. Meanwhile, the imidization catalyst which is used in an amount of 2.00 equivalents or less is preferable because the imidization catalyst which is used in such an amount causes a large percentage of the imidization catalyst to be involved in reaction.

In order to impart processability and various functionalities to the alkoxysilane-modified polyamic acid solution in accordance with the present invention, it is possible to blend other various organic or inorganic low molecular weight or high molecular weight compounds with the alkoxysilane-modified polyamic acid solution. For example, it is possible to use a dye, a plasticizer, inorganic fine particles, a sensitizer, and/or the like. Examples of the inorganic fine particles encompass: inorganic oxide powders such as a particulate silicon dioxide (silica) powder and a particulate aluminum oxide powder; and inorganic salt powders such as a particulate calcium carbonate powder and a particulate calcium phosphate powder. In the field of the present invention, a coarse grain among such inorganic fine particles may cause a defect in subsequent steps. Thus, the inorganic fine particles are preferably uniformly dispersed. The inorganic fine particles can have a porous or hollow structure. The inorganic fine particles can function as a pigment, a filler, or the like. Further, the inorganic fine particles can be in a form of, for example, a fiber.

Note that it is preferable that the organic or inorganic low molecular weight or high molecular weight compounds be smaller than the foreign matter (described earlier) and have a size of less than 0.5 μm.

A polyimide film to be produced from the alkoxysilane-modified polyamic acid solution of the present invention has low linear thermal expandability. In a case where a coefficient of linear thermal expansion is measured as a value indicative of linear thermal expandability by use of, for example, thermomechanical analysis (TMA), the coefficient of linear thermal expansion can be measured by the method below. First, a polyimide film whose thickness has been measured is cut so as to obtain a film sample having a size of 10 mm×3 mm. Then, a load of 29.4 mN is applied to the obtained film sample, and the film sample is (i) temporarily heated from 20° C. to 500° C. at a rate of 10° C./min in a nitrogen atmosphere, (ii) cooled to 20° C., and (iii) further heated to 500° C. at a rate of 10° C./min. The coefficient of linear thermal expansion can be found by use of an amount of change in distortion of the film sample per unit temperature in a range of 100° C. to 300° C. during the second heating (in the above (iii)). From the viewpoint that the coefficient of linear thermal expansion of the polyimide film, which coefficient is found by the above measurement method, is equivalent to a coefficient of linear thermal expansion of glass, the polyimide film has a coefficient of linear thermal expansion preferably of 1 ppm/° C. or more and 20 ppm/° C. or less, more preferably of 1 ppm/° C. or more and 10 ppm/° C. or less, and particularly preferably of 3 ppm/° C. or more and 10 ppm/° C. or less. Note that the coefficient of linear thermal expansion herein refers to a coefficient of linear thermal expansion in a range of 100° C. to 300° C., the coefficient being measured by the above measurement method.

According to the present invention, the polyimide film has a thickness preferably of 5 μm to 50 μm. The polyimide film which has a thickness of 5 μm or more ensures a mechanical strength that a substrate film is required to have. Meanwhile, the polyimide film which has a thickness of 50 µm or less allows the laminate including the polyimide film and the inorganic substrate to be obtained while no spontaneous peeling is caused in the laminate.

The polyimide film to be produced from the alkoxysilane-modified polyamic acid solution of the present invention has a haze whose upper limit value is preferably 5.0% or less, more preferably 2.0% or less, and particularly preferably 1.5% or less. The polyimide film has a haze whose lower limit value is not particularly limited. The polyimide film which has a haze of 1.5% or less can have a good appearance in a case where the polyimide film is formed into a flexible device. A haze value is measured by use of an integrating sphere haze meter 300A manufactured by NIPPON DENSHOKU INDUSTRIES CO., LTD. and in accordance with a method described in JIS K-7105. The laminate obtained by the present invention is excellent in storage stability and process consistency and thus can be suitably used to produce a flexible device by use of publicly known processing of a thin film transistor for a liquid crystal panel.

As described earlier, in a case where the alkoxysilane-modified polyamic acid solution which is cast on the inorganic substrate is heated and imidized, and a specific structure is selected for a skeleton of the polyamic acid, it is possible to obtain the laminate including the inorganic substrate and the polyimide film having a coefficient of linear thermal expansion of 1 ppm/° C. to 20 ppm/° C. Use of the obtained laminate makes it possible to obtain a flexible device having an excellent property.

A polyimide film to be produced from the surface control agent-containing alkoxysilane-modified polyamic acid solution of the present invention is highly adhesive to an inorganic substrate. As compared with the alkoxysilane-modified polyamic acid solution which contains no surface control agent, the alkoxysilane-modified polyamic acid solution which contains the surface control agent is more expected to allow the polyimide film to have a higher peel strength. For example, in a case where N-methyl-2-pyrolidone is used as a main solvent in the alkoxysilane-modified polyamic acid solution, the polyimide film preferably has a peel strength of 0.15 N/cm or more. The polyimide film which has a peel strength of 0.15 N/cm or more can be prevented from being peeled during formation of an electronic element. The peel strength is measured in accordance with ASTM D1876-01 standard.

<Formation of Electronic Element and Peeling of Polyimide Film from Inorganic Substrate>

Use of the laminate of the present invention makes it possible to obtain a flexible device having an excellent property. In other words, it is possible to obtain a flexible device by forming an electronic element on the polyimide film of the laminate of the present invention and then peeling the polyimide film from the inorganic substrate. Further, the above process for obtaining the flexible device is advantageous in that the process can employ, as it is, an existing production apparatus in which an inorganic substrate is used. Thus, the laminate of the present invention can be effectively used in the field of electronic devices such as a flat panel display and electronic paper, and is also suitable for mass-production of flexible devices.

The present invention also encompasses a method for producing a polyimide film, the method including the step of: peeling the polyimide film from an inorganic substrate of a laminate obtained by such a method as described earlier for producing a laminate.

The polyimide film can be peeled from the inorganic substrate by use of a publicly known method. For example, the polyimide film can be stripped from the inorganic substrate manually or by use of a machine such as a driving roller or a robot. The polyimide film can also be peeled from the inorganic substrate by providing a release layer between the inorganic substrate and the polyimide film. Alternatively, the polyimide film can be peeled from the inorganic substrate by, for example, (i) infiltrating, with an etching liquid, a silicon oxide film that is formed on the inorganic substrate which has many grooves, or (ii) causing laser beams to separate the polyimide film from the inorganic substrate on which an amorphous silicon layer is provided.

A flexible device of the present invention includes: a polyimide film obtained from the alkoxysilane-modified polyamic acid solution (described earlier); and an electronic element provided on the polyimide film. The flexible device of the present invention includes a polyimide film that has excellent heat resistance and a low coefficient of linear thermal expansion. The flexible device also has excellent properties such as not only a lightweight property and high impact resistance but also lower warpage. As to warpage in particular, a flexible device that is lower in warpage can be obtained by employing a method in which a polyimide film that has a low coefficient of linear thermal expansion which coefficient is as low as a coefficient of linear thermal expansion of an inorganic substrate is directly cast on and laminated to the inorganic substrate.

The present invention can also be arranged as below.

[1] An alkoxysilane-modified polyamic acid solution containing: an alkoxysilane-modified polyamic acid; and a surface control agent, the alkoxysilane-modified polyamic acid solution having a viscosity of 1,200 mPa·s to 20,000 mPa·s, the alkoxysilane-modified polyamic acid being obtained by reacting, in a polyamic acid solution, a polyamic acid with an alkoxysilane compound containing an amino group, and the polyamic acid being obtained by reacting a diamine with a tetracarboxylic dianhydride.

[2] The alkoxysilane-modified polyamic acid solution mentioned in [1], wherein the surface control agent is an acrylic compound or a silicone compound.

[3] The alkoxysilane-modified polyamic acid solution mentioned in [1] or [2], wherein the surface control agent is added in an amount of 0.0001 parts by weight or more and 0.1 parts by weight or less with respect to 100 parts by weight of the alkoxysilane-modified polyamic acid.

[4] The alkoxysilane-modified polyamic acid solution mentioned in any one of [1] through [3], wherein the alkoxysilane-modified polyamic acid solution contains an amide solvent as a main solvent.

[5] The alkoxysilane-modified polyamic acid solution mentioned in [4], wherein the amide solvent is N-methyl-2-pyrolidone.

[6] The alkoxysilane-modified polyamic acid solution mentioned in any one of [1] through [5], wherein the alkoxysilane-modified polyamic acid solution contains, in an amount of 100 pieces/g or smaller, foreign matter having a size of 0.5 µm or more.

[7] The alkoxysilane-modified polyamic acid solution mentioned in any one of [1] through [6], wherein: the tetracarboxylic dianhydride is 3,3',4,4'-biphenyltetracarboxylic dianhydride; and the diamine is a diamine represented by the following formula (1):

[Chem. 2]

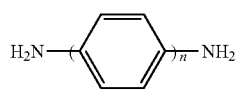

(1)

wherein n is any integer of 1 to 3.

[8] The alkoxysilane-modified polyamic acid solution mentioned in any one of [1] through [7], wherein the alkoxysilane compound is added in an amount of 0.01 parts by weight to 0.50 parts by weight in a case where the polyamic acid is contained in the alkoxysilane-modified polyamic acid solution in an amount of 100 parts by weight.

[9] The alkoxysilane-modified polyamic acid solution mentioned in any one of [1] through [8], wherein the tetracarboxylic dianhydride reacts with the diamine in a molar ratio of 0.980 or more and less than 1.000 with respect to the diamine, the molar ratio being obtained by dividing a total number of moles of the tetracarboxylic dianhydride by a total number of moles of the diamine.

[10] A laminate including: a polyimide film; and an inorganic substrate, the laminate being obtained by the steps of: casting, on the inorganic substrate, an alkoxysilane-modified polyamic acid solution mentioned in any one of [1] through [9]; and heating and imidizing the alkoxysilane-modified polyamic acid solution.

[11] A method for producing a laminate, the laminate including: a polyimide film; and an inorganic substrate, the method including the steps of: casting, on the inorganic substrate, an alkoxysilane-modified polyamic acid solution mentioned in any one of [1] through [9]; and subjecting the alkoxysilane-modified polyamic acid solution to thermal imidization, the thermal imidization being started at 100° C. to 150° C.

[12] A method for producing a polyimide film, the method including the step of: peeling the polyimide film from an inorganic substrate of a laminate obtained by a method mentioned in [11].

[13] A laminate including: a polyimide film obtained from an alkoxysilane-modified polyamic acid solution mentioned in any one of [1] through [9]; and an inorganic substrate to which the polyimide film is laminated, the polyimide film having a coefficient of linear thermal expansion of 20 ppm/° C. or less.

[14] A flexible device including: a polyimide film obtained from an alkoxysilane-modified polyamic acid solution mentioned in any one of [1] through [9]; and an electronic element provided on the polyimide film.

EXAMPLES

The following description specifically discusses the present invention with reference to Examples. Note, however, that the present invention is not limited by the Examples, but can encompass embodiments that are altered within the scope of the present invention.

(Property Evaluation Method)
(Measurement of Foreign Matter)

Approximately 65 g of N-methyl-2-pyrolidone whose amount of foreign matter had been measured in advance was weighed out into a 100 mL clean bottle. Into the clean bottle, approximately 15 g of a solution obtained in each of Examples and Comparative Examples was weighed out. The clean bottle was subjected to a treatment in which a stirring and defoaming machine (AR-250 manufactured by THINKY CORPORATION) was used at a rotation speed of 2000 rpm to carry out stirring for 3 minutes and defoaming for 27 minutes, so that a diluted solution for measurement was prepared. The prepared solution was subjected to measurement by use of a light scattering particle counter (SL1500 manufactured by Spectris Co., Ltd. and having a minimum measurable particle size of 0.2 μm). Assuming that a measured amount at one time was 10 mL (first 1 mL was discarded), the measurement was carried out 6 times (54 mL in total). From obtained measured values, an amount of foreign matter having a size of 0.5 μm or more and contained in one gram of the solution was calculated based on the following equation:

Amount of foreign matter contained in 1 g of solution=$(A-(B \times Wb/(Wa+Wb)))/54/(Wa/(Wa+Wb))$ where A indicates a measured value of the number of pieces of foreign matter having a size of 0.5 μm or more, B indicates a measured value of the number of pieces of foreign matter having a size of 0.5 μm or more and contained in N-methyl-2-pyrolidone used for dilution, Wa indicates a weight (g) of a solution obtained in each of Examples and weighed, and Wb indicates a weight (g) of the N-methyl-2-pyrolidone used for dilution and weighed.

Note that the particle counter used in the present measurement was calibrated in conformity with JIS B9925 standard before being used.

Note that no foreign matter was subjected to the measurement in Examples and Comparative Examples whose amounts of foreign matter are not shown in Tables 1 through 3 (described later).

(Water Content)

A water content in an alkoxysilane-modified polyamic acid solution was measured by use of a titrator for Karl Fischer coulometric titrations 890 Titrando (manufactured by Metrohm Japan) and in accordance with a method described in JIS K0068 (coulometric titration method). Note, however, that a mixed solution of AQUAMICRON GEX (manufactured by Mitsubishi Chemical Corporation) and N-methylpyrolidone in a ratio of 1:4 was used as a titration solvent.

(Viscosity)

A viscosity was measured by use of Viscometer RE-215/U (manufactured by Toki Sangyo Co. Ltd.) and in accordance with a method described in JIS K7117-2:1999. An accessory thermostat was set at 23.0° C. and a measurement temperature was maintained at a constant level at all times.

(Coefficient of Linear Thermal Expansion)

A coefficient of linear thermal expansion was evaluated by use of TMA/SS7100 manufactured by SII NanoTechnology Inc. and in accordance with thermo-mechanical analysis employing a tension loading method. The coefficient of linear thermal expansion was measured as below. A polyimide film of each of Examples and Comparative Examples was stripped from a glass substrate, which was an inorganic substrate, so that a sample having a size of 10 mm×3 mm was prepared. Then, a load of 29.4 mN was applied to a long side of the sample, and the sample was (i) temporarily heated from 20° C. to 500° C. at a rate of 10° C./min, (ii) cooled to 20° C., and (iii) further heated to 500° C. at a rate of 10° C./min. In this case, an amount of change in distortion of the sample per unit temperature in a range of 100° C. to 300° C. during the second heating (in the above (iii)) was regarded as the coefficient of linear thermal expansion.

(Haze of Polyimide Film)

A haze was measured by use of an integrating sphere haze meter 300A manufactured by NIPPON DENSHOKU INDUSTRIES CO., LTD. and in accordance with a method described in JIS K-7105.

(Evaluation of Surface Property of Polyimide Film)

Polyimide film laminates were prepared in accordance with methods described in Examples and Comparative Examples, and smoothness of surfaces thereof was visually observed and evaluated. The evaluation was carried out by the following criteria:

A: No asperities are visually confirmable on a film surface.
B: Asperities are visually confirmable at an end portion of the film surface.
C: Asperities are visually confirmable at the end portion and a part of the other portion of the film surface.
D: Asperities are visually confirmable on the entire film surface.

(Peel Strength)

In conformity with ASTM D1876-01 standard, a laminate was cut with a box cutter so as to obtain samples having a width of 10 mm, and an average of 90° peel strengths obtained in a case where 50 mm of each of respective polyimide films of the samples was stripped by use of a tensile testing machine (Strograph VES1D manufactured by Toyo Seiki Seisaku-sho, Ltd.) and at 23° C., RH of 55%, and a tensile speed of 50 mm/min was evaluated as a peel strength.

Note that there was a polyimide film that could be stripped from a glass plate without spontaneously peeling but had no measurable film characteristic. No peel strength of such a polyimide film is shown in Tables 1 through 3 (described later). Further, a case where a polyimide film had been peeled from a glass plate in a laminate and it was impossible to obtain a polyimide film having a measurable peel strength was evaluated as "×".

Example 1

<Production of Polyamic Acid Solution>

Into a 2 L glass separable flask including (i) a stirrer having a polytetrafluoroethylene sealing plug, (ii) a stirring blade, and (iii) a nitrogen inlet tube, 850.0 g of N-methyl-2-pyrolidone (hereinafter may be referred to as "NMP") was introduced. Then, 40.1 g of paraphenylene diamine (hereinafter may be referred to as "PDA") and 0.6 g of 4,4'-diamino diphenyl ether (hereinafter may be referred to as "ODA") were added. Thereafter, a resultant solution was stirred in a nitrogen atmosphere for 30 minutes while being heated to 50.0° C. in an oil bath. After it was confirmed that ingredients were uniformly dissolved, 109.3 g of 3,3',4,4'-biphenyltetracarboxylic dianhydride (hereinafter may be referred to as "BPDA") was added. Then, a temperature of the solution was adjusted to approximately 90° C. while the solution was being stirred in a nitrogen atmosphere for 10 minutes until ingredients were completely dissolved. Further, a viscosity of the solution was decreased by continuing stirring while heating the solution at a constant temperature, so that a viscous polyamic acid solution having a viscosity of 18,400 mPa·s at 23° C. was obtained. Note that a concentration of a diamine and a tetracarboxylic dianhydride which were placed in the above polyamic acid solution was 15 weight % with respect to a whole reaction solution. Note also that a molar ratio obtained by dividing a total number of moles of the tetracarboxylic dianhydride by a total number of moles of the diamine was 0.995.

<Modification with Alkoxysilane Compound>

The above reaction solution was rapidly cooled in a water bath, and a temperature of the solution was adjusted to approximately 50° C. Next, 7.5 g of a 1% NMP solution of 3-aminopropyl triethoxysilane (hereinafter may be referred to as "γ-APS") was added, and the solution was stirred for 2 hours. Then, in order that a resultant solution had a solid content concentration of 13.0 weight %, the solution was diluted by adding thereto NMP. Thus, an alkoxysilane-modified polyamic acid solution having a viscosity of 7,200 mPa·s at 23° C. and having a water content of 3000 ppm was obtained. Note that γ-APS was blended (added) in the above reaction in an amount of 0.05 parts by weight with respect to 100 parts by weight of polyamic acid.

To the obtained alkoxysilane-modified polyamic acid solution, an acrylic surface control agent (DISPARLON LF-1980 manufactured by Kusumoto Chemicals, Ltd.) was added so as to be contained in an amount of 0.01 parts by weight with respect to 100 parts by weight of alkoxysilane-modified polyamic acid. Then, a resultant solution was uniformly dispersed, so that a surface control agent-containing alkoxysilane-modified polyamic acid solution was obtained. The obtained surface control agent-containing alkoxysilane-modified polyamic acid solution was subjected to multistage filtration by use of a filter having a pore size of 0.5 μm and a filter having a pore size of 0.2 μm. Table 1 shows results of evaluation of foreign matter.

<Casting and Imidization of Surface Control Agent-Containing Alkoxysilane-Modified Polyamic Acid Solution>

The obtained alkoxysilane-modified polyamic acid solution was cast on an alkali-free glass plate (Eagle XG manufactured by Corning Incorporated), having a square shape of 150 mm in side and 0.7 mm in thickness, by use of a bar coater so as to have a thickness of 20 μm after drying. Then, the cast alkoxysilane-modified polyamic acid solution was dried in a hot air oven at 120° C. for 30 minutes. Thereafter, the alkoxysilane-modified polyamic acid solution was heated from 20° C. to 180° C. at a rate of 4° C./min in a nitrogen atmosphere, heated at 180° C. for 10 minutes, heated from 180° C. to 450° C. at a rate of 4° C./min, and heated at 450° C. for 10 minutes, so that a laminate including the alkali-free glass plate and a polyimide film having a thickness of 20 μm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 2

The surface control agent-containing alkoxysilane-modified polyamic acid solution (unfiltrated) obtained in Example 1 was cast on an alkali-free glass plate (Eagle XG manufactured by Corning Incorporated), having a square shape of 150 mm in side and 0.7 mm in thickness, by use of a bar coater so as to have a thickness of 20 μm after drying. Then, the cast alkoxysilane-modified polyamic acid solution was dried in a hot air oven at 150° C. for 30 minutes. Thereafter, the alkoxysilane-modified polyamic acid solution was heated from 20° C. to 450° C. at a rate of 4° C./min in a nitrogen atmosphere and heated at 450° C. for 10 minutes, so that a laminate including the alkali-free glass plate and a polyimide film having a thickness of 20 μm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 3

In order that a resultant solution had a solid content concentration of 12.5 weight %, the surface control agent-containing alkoxysilane-modified polyamic acid solution (unfiltrated) obtained in Example 1 was diluted by adding thereto NMP. Thus, a surface control agent-containing alkoxysilane-modified polyamic acid solution having a viscosity of 5000 mPa·s was obtained. The surface control agent-containing alkoxysilane-modified polyamic acid solution was cast on an alkali-free glass plate (Eagle XG manufactured by Corning Incorporated), having a square shape of 150 mm in side and 0.7 mm in thickness, by use of a bar coater so as to have a thickness of 20 µm after drying. Then, the cast alkoxysilane-modified polyamic acid solution was dried in a hot air oven at 120° C. for 30 minutes. Thereafter, the alkoxysilane-modified polyamic acid solution was heated from 20° C. to 180° C. at a rate of 4° C./min in a nitrogen atmosphere, heated at 180° C. for 10 minutes, heated from 180° C. to 450° C. at a rate of 4° C./min, and heated at 450° C. for 10 minutes, so that a laminate including the alkali-free glass plate and a polyimide film having a thickness of 20 µm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 4

In order that a resultant solution had a solid content concentration of 11.5 weight %, the surface control agent-containing alkoxysilane-modified polyamic acid solution (unfiltrated) obtained in Example 1 was diluted by adding thereto NMP. Thus, a surface control agent-containing alkoxysilane-modified polyamic acid solution having a viscosity of 3000 mPa·s was obtained. The surface control agent-containing alkoxysilane-modified polyamic acid solution was cast on an alkali-free glass plate (Eagle XG manufactured by Corning Incorporated), having a square shape of 150 mm in side and 0.7 mm in thickness, by use of a bar coater so as to have a thickness of 18 µm after drying. Then, the cast alkoxysilane-modified polyamic acid solution was dried in a hot air oven at 120° C. for 30 minutes. Thereafter, the alkoxysilane-modified polyamic acid solution was heated from 20° C. to 180° C. at a rate of 4° C./min in a nitrogen atmosphere, heated at 180° C. for 10 minutes, heated from 180° C. to 450° C. at a rate of 4° C./min, and heated at 450° C. for 10 minutes, so that a laminate including the alkali-free glass plate and a polyimide film having a thickness of 18 µm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 5

Example 5 obtained, as in the case of Example 1, (a) a surface control agent-containing alkoxysilane-modified polyamic acid solution and (b) a laminate including an alkali-free glass plate and a polyimide film having a thickness of 20 µm, except (i) that Example 5 added a surface control agent in an amount of 0.005 parts by weight with respect to 100 parts by weight of alkoxysilane-modified polyamic acid and (ii) that Example 5 carried out no filtration. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 6

Example 6 obtained, as in the case of Example 1, a laminate including an alkali-free glass plate and a polyimide film having a thickness of 20 µm, except (i) that Example 6 added, as a surface control agent, an acrylic surface control agent (DISPARLON LF-1985 manufactured by Kusumoto Chemicals, Ltd.) in an amount of 0.01 parts by weight with respect to 100 parts by weight of alkoxysilane-modified polyamic acid and (ii) that Example 6 carried out no filtration. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 7

Example 7 obtained, as in the case of Example 1, a laminate including an alkali-free glass plate and a polyimide film having a thickness of 20 µm, except (i) that Example 7 added, as a surface control agent, an acrylic surface control agent (DISPARLON LF-1985 manufactured by Kusumoto Chemicals, Ltd.) in an amount of 0.005 parts by weight with respect to 100 parts by weight of alkoxysilane-modified polyamic acid and (ii) that Example 7 carried out no filtration. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 8

Example 8 obtained a surface control agent-containing alkoxysilane-modified polyamic acid solution (unfiltrated) as in the case of Example 1, except that Example 8 added, as a surface control agent, an acrylic surface control agent (BYK-3440 manufactured by BYK Japan KK) in an amount of 0.01 parts by weight with respect to 100 parts by weight of alkoxysilane-modified polyamic acid. Then, Example 8 carried out multistage filtration with respect to the obtained surface control agent-containing alkoxysilane-modified polyamic acid solution by use of a filter having a pore size of 0.5 µm and a filter having a pore size of 0.2 µm. Table 1 shows results of evaluation of foreign matter. Example 8 used the surface control agent-containing alkoxysilane-modified polyamic acid solution to obtain, as in the case of Example 1, a laminate including an alkali-free glass plate and a polyimide film having a thickness of 20 µm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 9

Example 9 used the surface control agent-containing alkoxysilane-modified polyamic acid solution (unfiltrated) obtained in Example 8 to obtain, as in the case of Example 2, a laminate including an alkali-free glass plate and a polyimide film having a thickness of 20 µm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 10

In order that a resultant solution had a solid content concentration of 12.5 weight %, the surface control agent-containing alkoxysilane-modified polyamic acid solution (unfiltrated) obtained in Example 8 was diluted by adding thereto NMP. Thus, a surface control agent-containing alkoxysilane-modified polyamic acid solution having a viscosity of 5000 mPa·s was obtained. Example 10 used the surface control agent-containing alkoxysilane-modified polyamic acid solution to obtain, as in the case of Example 1, a laminate including an alkali-free glass plate and a polyimide film having a thickness of 18 µm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 11

In order that a resultant solution had a solid content concentration of 11.5 weight %, the surface control agent-containing alkoxysilane-modified polyamic acid solution (unfiltrated) obtained in Example 8 was diluted by adding thereto NMP. Thus, a surface control agent-containing alkoxysilane-modified polyamic acid solution having a viscosity of 3000 mPa·s was obtained. Example 11 used the surface control agent-containing alkoxysilane-modified polyamic acid solution to obtain, as in the case of Example 1, a laminate including an alkali-free glass plate and a polyimide film having a thickness of 19 µm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 12

Example 12 obtained, as in the case of Example 1, a laminate including an alkali-free glass plate and a polyimide film having a thickness of 20 µm, except (i) that Example 12 added, as a surface control agent, an acrylic surface control agent (BYK-3440 manufactured by BYK Japan KK) in an amount of 0.005 parts by weight with respect to 100 parts by weight of alkoxysilane-modified polyamic acid and (ii) that Example 12 carried out no filtration. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 13

Example 13 obtained, as in the case of Example 1, a laminate including an alkali-free glass plate and a polyimide film having a thickness of 20 µm, except (i) that Example 13 added, as a surface control agent, an acrylic surface control agent (BYK-3441 manufactured by BYK Japan KK) in an amount of 0.01 parts by weight with respect to 100 parts by weight of alkoxysilane-modified polyamic acid and (ii) that Example 13 carried out no filtration. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 14

Example 14 obtained, as in the case of Example 1, a laminate including an alkali-free glass plate and a polyimide film having a thickness of 20 µm, except (i) that Example 14 added, as a surface control agent, an acrylic surface control agent (BYK-3441 manufactured by BYK Japan KK) in an amount of 0.005 parts by weight with respect to 100 parts by weight of alkoxysilane-modified polyamic acid and (ii) that Example 14 carried out no filtration. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 15

Example 15 obtained, as in the case of Example 1, a laminate including an alkali-free glass plate and a polyimide film having a thickness of 20 µm, except (i) that Example 15 added, as a surface control agent, an acrylic surface control agent (BYK-350 manufactured by BYK Japan KK) in an amount of 0.01 parts by weight with respect to 100 parts by weight of alkoxysilane-modified polyamic acid and (ii) that Example 15 carried out no filtration. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 16

Example 16 obtained, as in the case of Example 1, a laminate including an alkali-free glass plate and a polyimide film having a thickness of 20 µm, except (i) that Example 16 added, as a surface control agent, an acrylic surface control agent (BYK-361N manufactured by BYK Japan KK) in an amount of 0.01 parts by weight with respect to 100 parts by weight of alkoxysilane-modified polyamic acid and (ii) that Example 16 carried out no filtration. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 17

<Production of Polyamic Acid Solution>
Into a 2 L glass separable flask including (i) a stirrer having a polytetrafluoroethylene sealing plug, (ii) a stirring blade, and (iii) a nitrogen inlet tube, 850.0 g of NMP was introduced. Then, 39.8 g of PDA and 0.6 g of ODA were added. Thereafter, a resultant solution was stirred in a nitrogen atmosphere for 30 minutes while being heated to 50.0° C. in an oil bath. After it was confirmed that ingredients were uniformly dissolved, 109.6 g of BPDA was added. Then, a temperature of the solution was adjusted to approximately 90° C. while the solution was being stirred in a nitrogen atmosphere for 10 minutes until ingredients were completely dissolved. Further, a viscosity of the solution was decreased by continuing stirring while heating the solution at a constant temperature, so that a viscous polyamic acid solution having a viscosity of 34,200 mPa·s at 23° C. was obtained. Note that a concentration of a diamine and a tetracarboxylic dianhydride which were placed in the above reaction solution was 15 weight % with respect to a whole reaction solution. Note also that a molar ratio obtained by dividing a total number of moles of the tetracarboxylic dianhydride by a total number of moles of the diamine was 1.05.
<Modification with Alkoxysilane Compound>
The above reaction solution was rapidly cooled in a water bath, and a temperature of the solution was adjusted to approximately 50° C. Next, 7.5 g of a 1% NMP solution of γ-APS) was added, and the solution was stirred for 2 hours. Then, in order that a resultant solution had a solid content concentration of 11.2 weight %, the solution was diluted by adding thereto NMP. Thus, an alkoxysilane-modified polyamic acid solution having a viscosity of 6,700 mPa·s at 23° C. and having a water content of 2200 ppm was obtained. Note that γ-APS was blended (added) in the above reaction in an amount of 0.05 parts by weight with respect to 100 parts by weight of polyamic acid.

To the obtained alkoxysilane-modified polyamic acid solution, an acrylic surface control agent (DISPARLON LF-1980 manufactured by Kusumoto Chemicals, Ltd.) was added so as to be contained in an amount of 0.01 parts by weight with respect to 100 parts by weight of alkoxysilane-modified polyamic acid. Then, a resultant solution was uniformly dispersed, so that a surface control agent-containing alkoxysilane-modified polyamic acid solution was obtained.

Example 17 used the obtained surface control agent-containing alkoxysilane-modified polyamic acid solution to obtain, as in the case of Example 1, a laminate including an alkali-free glass plate and a polyimide film having a thickness of 20 µm. Note, however, that Example 17 carried out no filtration with respect to the obtained surface control agent-containing alkoxysilane-modified polyamic acid solution. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 1 shows results of evaluation of the polyimide film.

Example 18

Example 18 obtained, as in the case of Example 4, a laminate including an alkali-free glass plate and a polyimide film having a thickness of 20 µm, except that Example 18 added, as a surface control agent, an acrylic surface control agent (BYK-361N manufactured by BYK Japan KK) in an amount of 0.01 parts by weight with respect to 100 parts by weight of alkoxysilane-modified polyamic acid. Example 18 carried out no filtration with respect to a surface control agent-containing alkoxysilane-modified polyamic acid solution. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 19

Example 19 obtained, as in the case of Example 18, a laminate including an alkali-free glass plate and a polyimide film having a thickness of 20 µm, except that Example 19 carried out filtration with respect to a surface control agent-containing alkoxysilane-modified polyamic acid solution by use of a filter having a pore size of 0.5 µm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 20

Example 20 obtained, as in the case of Example 18, a laminate including an alkali-free glass plate and a polyimide film having a thickness of 20 µm, except that Example 20 added, as a surface control agent, an acrylic surface control agent (BYK-361N manufactured by BYK Japan KK) in an amount of 0.02 parts by weight with respect to 100 parts by weight of alkoxysilane-modified polyamic acid. Example 20 carried out no filtration with respect to a surface control agent-containing alkoxysilane-modified polyamic acid solution. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 21

Example 21 obtained, as in the case of Example 20, a laminate including an alkali-free glass plate and a polyimide film having a thickness of 20 µm, except that Example 21 carried out filtration with respect to a surface control agent-containing alkoxysilane-modified polyamic acid solution by use of a filter having a pore size of 0.5 µm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 22

Example 22 obtained, as in the case of Example 20, a laminate including an alkali-free glass plate and a polyimide film having a thickness of 20 µm, except that Example 22 carried out multistage filtration with respect to a surface control agent-containing alkoxysilane-modified polyamic acid solution by use of a filter having a pore size of 0.5 µm and a filter having a pore size of 0.2 µm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 23

The surface control agent-containing alkoxysilane-modified polyamic acid solution obtained in Example 20 was cast on an alkali-free glass plate (Eagle XG manufactured by Corning Incorporated), having a square shape of 150 mm in side and 0.7 mm in thickness, by use of a bar coater so as to have a thickness of 20 µm after drying. Then, the cast alkoxysilane-modified polyamic acid solution was dried in a hot air oven at 150° C. for 30 minutes. Thereafter, the alkoxysilane-modified polyamic acid solution was heated from 20° C. to 450° C. at a rate of 4° C./min in a nitrogen atmosphere and heated at 450° C. for 10 minutes, so that a laminate including the alkali-free glass plate and a polyimide film having a thickness of 20 µm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 24

The surface control agent-containing alkoxysilane-modified polyamic acid solution obtained in Example 22 was cast on an alkali-free glass plate (Eagle XG manufactured by Corning Incorporated), having a square shape of 150 mm in side and 0.7 mm in thickness, by use of a bar coater so as to have a thickness of 20 µm after drying. Then, the cast alkoxysilane-modified polyamic acid solution was dried in a hot air oven at 150° C. for 30 minutes. Thereafter, the alkoxysilane-modified polyamic acid solution was heated from 20° C. to 450° C. at a rate of 4° C./min in a nitrogen atmosphere and heated at 450° C. for 10 minutes, so that a laminate including the alkali-free glass plate and a polyimide film having a thickness of 20 µm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 25

Example 25 obtained, as in the case of Example 18, a laminate including an alkali-free glass plate and a polyimide film having a thickness of 20 µm, except that Example 25 added, as a surface control agent, an acrylic surface control agent (BYK-361N manufactured by BYK Japan KK) in an amount of 0.05 parts by weight with respect to 100 parts by weight of alkoxysilane-modified polyamic acid. Example 25 carried out no filtration with respect to a surface control agent-containing alkoxysilane-modified polyamic acid solution. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 26

Example 26 obtained, as in the case of Example 25, a laminate including an alkali-free glass plate and a polyimide film having a thickness of 20 µm, except that Example 26 carried out multistage filtration with respect to a surface control agent-containing alkoxysilane-modified polyamic acid solution by use of a filter having a pore size of 0.5 µm and a filter having a pore size of 0.2 µm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 27

The surface control agent-containing alkoxysilane-modified polyamic acid solution obtained in Example 25 was cast on an alkali-free glass plate (Eagle XG manufactured by Corning Incorporated), having a square shape of 150 mm in side and 0.7 mm in thickness, by use of a bar coater so as to have a thickness of 20 μm after drying. Then, the cast alkoxysilane-modified polyamic acid solution was dried in a hot air oven at 150° C. for 30 minutes. Thereafter, the alkoxysilane-modified polyamic acid solution was heated from 20° C. to 450° C. at a rate of 4° C./min in a nitrogen atmosphere and heated at 450° C. for 10 minutes, so that a laminate including the alkali-free glass plate and a polyimide film having a thickness of 20 μm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 28

The surface control agent-containing alkoxysilane-modified polyamic acid solution obtained in Example 26 was cast on an alkali-free glass plate (Eagle XG manufactured by Corning Incorporated), having a square shape of 150 mm in side and 0.7 mm in thickness, by use of a bar coater so as to have a thickness of 20 μm after drying. Then, the cast alkoxysilane-modified polyamic acid solution was dried in a hot air oven at 150° C. for 30 minutes. Thereafter, the alkoxysilane-modified polyamic acid solution was heated from 20° C. to 450° C. at a rate of 4° C./min in a nitrogen atmosphere and heated at 450° C. for 10 minutes, so that a laminate including the alkali-free glass plate and a polyimide film having a thickness of 20 μm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Example 29

<Production of Polyamic Acid Solution>

Into a 2 L glass separable flask including (i) a stirrer having a polytetrafluoroethylene sealing plug, (ii) a stirring blade, and (iii) a nitrogen inlet tube, 170.0 g of 1,3-dimethyl-2-imidazolidinone (hereinafter may be referred to as "DMI") was introduced. Then, 8.01 g of paraphenylene diamine PDA and 0.12 g of ODA were added. Thereafter, a resultant solution was stirred in a nitrogen atmosphere for 30 minutes while being heated to 50.0° C. in an oil bath. After it was confirmed that ingredients were uniformly dissolved, 21.76 g of BPDA was added. Then, in a nitrogen atmosphere, the solution continued to be stirred for 270 minutes while being heated at a temperature of 50° C. Thus, a viscous polyamic acid solution having a viscosity of 73,300 mPa·s at 23° C. was obtained. Note that a concentration of a diamine and a tetracarboxylic dianhydride which were placed in the above polyamic acid solution was 15 weight % with respect to a whole reaction solution. Note also that a molar ratio obtained by dividing a total number of moles of the tetracarboxylic dianhydride by a total number of moles of the diamine was 0.990.

<Modification with Alkoxysilane Compound>

The above reaction solution was rapidly cooled in a water bath, and a temperature of the solution was adjusted to approximately 50° C. Next, 1.50 g of a 1% DMI solution of γ-APS was added, and the solution was stirred for 2 hours. Then, in order that a resultant solution had a solid content concentration of 10.8 weight %, the solution was diluted by adding thereto DMI. Thus, an alkoxysilane-modified polyamic acid solution having a viscosity of 7,000 mPa·s at 23° C. and having a water content of 3000 ppm was obtained. Note that γ-APS was blended (added) in the above reaction in an amount of 0.05 parts by weight with respect to 100 parts by weight of polyamic acid. To the obtained alkoxysilane-modified polyamic acid solution, an acrylic surface control agent (DISPARLON LF-1980 manufactured by Kusumoto Chemicals, Ltd.) was added so as to be contained in an amount of 0.01 parts by weight with respect to 100 parts by weight of alkoxysilane-modified polyamic acid. Then, a resultant solution was uniformly dispersed, so that a surface control agent-containing alkoxysilane-modified polyamic acid solution was obtained.

<Casting and Imidization of Surface Control Agent-Containing Alkoxysilane-Modified Polyamic Acid Solution>

The obtained alkoxysilane-modified polyamic acid solution was cast on an alkali-free glass plate (Eagle XG manufactured by Corning Incorporated), having a square shape of 150 mm in side and 0.7 mm in thickness, by use of a bar coater so as to have a thickness of 20 μm after drying. Then, the cast alkoxysilane-modified polyamic acid solution was dried in a hot air oven at 120° C. for 30 minutes. Thereafter, the alkoxysilane-modified polyamic acid solution was heated from 120° C. to 450° C. at a rate of 4° C./min in a nitrogen atmosphere and heated at 450° C. for 10 minutes, so that a laminate including the alkali-free glass plate and a polyimide film having a thickness of 20 μm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 2 shows results of evaluation of the polyimide film.

Comparative Example 1

Comparative Example 1 used a filter having a pore size of 0.5 μm and a filter having a pore size of 0.2 μm to carry out multistage filtration with respect to the alkoxysilane-modified polyamic acid solution which had been obtained in Example 1 and to which no surface control agent had been added. Comparative Example 1 used the obtained alkoxysilane-modified polyamic acid solution to obtain, as in the case of Example 1, a laminate including an alkali-free glass plate and a polyimide film having a thickness of 20 μm. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film had, on an entire surface thereof, visually confirmable asperities due to nonuniformity in thickness. This made it impossible to obtain a polyimide film having a measurable film characteristic. Table 3 shows results of evaluation of the polyimide film.

Comparative Example 2

The alkoxysilane-modified polyamic acid solution which had been obtained in Example 1 and to which no surface control agent had been added was cast on an alkali-free glass plate (Eagle XG manufactured by Corning Incorporated), having a square shape of 150 mm in side and 0.7 mm in thickness and generally used as an FPD glass substrate, by use of a bar coater so as to have a thickness of 20 μm after drying. Then, the cast alkoxysilane-modified polyamic acid solution was dried in a hot air oven at 80° C. for 30 minutes and further at 120° C. for 30 minutes. Thereafter, the alkoxysilane-modified polyamic acid solution was heated from 20° C. to 180° C. at a rate of 4° C./min in a nitrogen atmosphere, heated at 180° C. for 20 minutes, heated from 180° C. to 450° C. at a rate of 4° C./min, and heated at 450° C. for 10 minutes, so that a laminate including the alkali-free glass plate and a polyimide film having a thickness of 20 μm was obtained. The polyimide film and the alkali-free glass plate had a moderate peel strength, so that the polyimide film did not spontaneously peel off the alkali-free glass plate during heating. Note, however, that the polyimide film could be stripped from the alkali-free glass plate. Table 3 shows results of evaluation of the polyimide film.

Comparative Example 3

The alkoxysilane-modified polyamic acid solution which had been obtained in Example 1 and to which no surface control agent had been added was cast on an alkali-free glass plate (Eagle XG manufactured by Corning Incorporated), having a square shape of 150 mm in side and 0.7 mm in thickness and generally used as an FPD glass substrate, by use of a bar coater so as to have a thickness of 20 μm after drying. Then, the cast alkoxysilane-modified polyamic acid solution was dried in a hot air oven at 80° C. for 30 minutes. Thereafter, the alkoxysilane-modified polyamic acid solution was heated from 20° C. to 150° C. at a rate of 4° C./min in a nitrogen atmosphere, heated at 150° C. for 20 minutes, heated from 150° C. to 350° C. at a rate of 4° C./min, heated at 350° C. for minutes, heated from 350° C. to 450° C. at a rate of 4° C./min, and heated at 450° C. for 40 minutes, so that a laminate including the alkali-free glass plate and a polyimide film having a thickness of 20 μm was obtained. The polyimide film and the alkali-free glass plate had a moderate peel strength, so that the polyimide film did not spontaneously peel off the alkali-free glass plate during imidization. Note, however, that the polyimide film could be stripped from the alkali-free glass. Table 3 shows results of evaluation of the polyimide film.

Comparative Example 4

Comparative Example 4 obtained a polyamic acid solution as in the case of Example 1, except that
Comparative Example 4 used, as a solvent, N,N-dimethylacetamide (hereinafter may be referred to as "DMAc") instead of NMP. Thereafter, without adding γ-APS, Comparative Example 4 diluted the polyamic acid solution with N,N-dimethylacetamide until the polyamic acid solution had a viscosity at which the polyamic acid solution was easily treatable, so that Comparative Example 4 obtained a polyamic acid solution having a viscosity of 13600 mPa·s and having a water content of 1100 ppm. Comparative Example 4 cast and imidized the obtained solution on an alkali-free glass plate as in the case of Comparative Example 2. Note, however, that as a result of observation of an obtained laminate, bubbles were generated between an alkali-free glass plate and a polyimide film, so that the polyimide film which accounted for a part of the laminate was peeled from the alkali-free glass plate. Table 3 shows properties of the resultant polyimide film.

Comparative Example 5

Into a 2 L glass separable flask including (i) a stirrer having a polytetrafluoroethylene sealing plug, (ii) a stirring blade, and (iii) a nitrogen inlet tube, 850.0 g of NMP was introduced. Then, 40.1 g of PDA and 0.6 g of ODA were added. Thereafter, a resultant solution was stirred in a nitrogen atmosphere for 30 minutes while being heated to 50.0° C. in an oil bath. After it was confirmed that ingredients were uniformly dissolved, 109.3 g of BPDA was added. Then, a temperature of the solution was adjusted to approximately 90° C. while the solution was being stirred in a nitrogen atmosphere for 10 minutes until ingredients were completely dissolved. Further, a viscosity of the solution was decreased by continuing stirring while heating the solution at a constant temperature, so that a viscous polyamic acid solution having a viscosity of 18,400 mPa·s at 23° C. was obtained. Note that a concentration of a diamine and a tetracarboxylic dianhydride which were placed in the above reaction solution was 15 weight % with respect to a whole reaction solution. Note also that a molar ratio obtained by dividing a total number of moles of the tetracarboxylic dianhydride by a total number of moles of the diamine was 0.995. Then, in order that a resultant solution had a solid content concentration of 11.2 weight %, the solution was diluted by adding thereto NMP. Thus, a polyamic acid solution having a viscosity of 7,200 mPa·s at 23° C. and having a water content of 2500 ppm was obtained.
Comparative Example 5 heated and imidized the obtained polyamic acid solution as in the case of Example 1. Note, however, that Comparative Example 5 did not carry out modification with an alkoxysilane compound, addition of a surface control agent, and filtration. As a result of observation of an obtained laminate, bubbles were generated between a polyimide film and an alkali-free glass plate, so that the polyimide film which accounted for most of the laminate was peeled from the alkali-free glass plate. Table 3 shows results of evaluation of the polyimide film. Note, however, that Comparative Example 5 did not carry out measurement with respect to the polyimide film, whose peel strength, haze, and coefficient of linear thermal expansion were unmeasurable.

Comparative Example 6

To the polyamic acid solution obtained in Comparative Example 5, an acrylic surface control agent (DISPARLON LF-1980 manufactured by Kusumoto Chemicals, Ltd.) was added so as to be contained in an amount of 0.01 parts by weight with respect to 100 parts by weight of polyamic acid. Then, a resultant solution was uniformly dispersed, so that a surface control agent-containing polyamic acid solution was obtained. Comparative Example 6 heated and imidized the obtained surface control agent-containing polyamic acid as in the case of Example 1. Note, however, that Comparative Example 6 did not carry out modification with an alkoxysilane compound and filtration. As a result of observation of an obtained laminate, bubbles were generated between a polyimide film and an alkali-free glass plate, so that the polyimide film which accounted for most of the laminate was peeled from the alkali-free glass plate. Table 3 shows results of evaluation of the polyimide film. Note, however, that Comparative Example 6 did not carry out measurement with respect to the polyimide film, whose peel strength, haze, and coefficient of linear thermal expansion were unmeasurable.

Comparative Example 7

<Production of Polyamic Acid Solution>

Into a 2 L glass separable flask including (i) a stirrer having a polytetrafluoroethylene sealing plug, (ii) a stirring blade, and (iii) a nitrogen inlet tube, 850.0 g of NMP was introduced. Then, 40.1 g of PDA and 0.6 g of ODA were added. Thereafter, a resultant solution was stirred in a nitrogen atmosphere for 30 minutes while being heated to 50.0° C. in an oil bath. After it was confirmed that ingredients were uniformly dissolved, 109.3 g of BPDA was added. Then, a temperature of the solution was adjusted to approximately 90° C. while the solution was being stirred in a nitrogen atmosphere for 10 minutes until ingredients were completely dissolved. Further, a viscosity of the solution was decreased by continuing stirring while heating the solution at a constant temperature, so that a viscous polyamic acid solution having a viscosity of 25,600 mPa·s at 23° C. was obtained. Note that a concentration of a diamine and a tetracarboxylic dianhydride which were placed in the above polyamic acid solution was 15 weight % with respect to a whole reaction solution. Note also that a molar ratio obtained by dividing a total number of moles of the tetracarboxylic dianhydride by a total number of moles of the diamine was 0.995.

<Modification with Alkoxysilane Compound>

The above reaction solution was rapidly cooled in a water bath, and a temperature of the solution was adjusted to approximately 50° C. Next, 7.5 g of a 1% NMP solution of γ-glycidoxypropyltrimethoxysilane (hereinafter may be referred to as "γ-GPS") was added, and the solution was stirred for 2 hours. Then, in order that a resultant solution had a solid content concentration of 11.0 weight %, the solution was diluted by adding thereto NMP. Thus, an alkoxysilane-modified polyamic acid solution having a viscosity of 3,300 mPa·s at 23° C. and having a water content of 2500 ppm was obtained. Note that γ-GPS was blended (added) in the above reaction in an amount of 0.05 parts by weight with respect to 100 parts by weight of polyamic acid.

To the obtained alkoxysilane-modified polyamic acid solution, an acrylic surface control agent (BYK-361N manufactured by BYK Japan KK) was added so as to be contained in an amount of 0.02 parts by weight with respect to 100 parts by weight of alkoxysilane-modified polyamic acid. Then, a resultant solution was uniformly dispersed, so that a surface control agent-containing alkoxysilane-modified polyamic acid solution was obtained.

<Casting and Imidization of Surface Control Agent-Containing Alkoxysilane-Modified Polyamic Acid Solution>

The obtained alkoxysilane-modified polyamic acid solution was cast on an alkali-free glass plate (Eagle XG manufactured by Corning Incorporated), having a square shape of 150 mm in side and 0.7 mm in thickness, by use of a bar coater so as to have a thickness of 20 μm after drying. Then, the cast alkoxysilane-modified polyamic acid solution was dried in a hot air oven at 120° C. for 30 minutes. Thereafter, the alkoxysilane-modified polyamic acid solution was heated from 20° C. to 180° C. at a rate of 4° C./min in a nitrogen atmosphere, heated at 180° C. for 10 minutes, heated from 180° C. to 450° C. at a rate of 4° C./min, and heated at 450° C. for 10 minutes, so that a laminate including the alkali-free glass plate and a polyimide film having a thickness of 20 μm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 3 shows results of evaluation of the polyimide film.

Comparative Example 8

The surface control agent-containing alkoxysilane-modified polyamic acid solution obtained in Comparative Example 7 was cast on an alkali-free glass plate (Eagle XG manufactured by Corning Incorporated), having a square shape of 150 mm in side and 0.7 mm in thickness, by use of a bar coater so as to have a thickness of 20 μm after drying. Then, the cast alkoxysilane-modified polyamic acid solution was dried in a hot air oven at 150° C. for 30 minutes. Thereafter, the alkoxysilane-modified polyamic acid solution was heated from 20° C. to 450° C. at a rate of 4° C./min in a nitrogen atmosphere and heated at 450° C. for 10 minutes, so that a laminate including the alkali-free glass plate and a polyimide film having a thickness of 20 μm was obtained. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film could be stripped from the alkali-free glass plate. Table 3 shows results of evaluation of the polyimide film.

Comparative Example 9

Comparative Example 9 obtained, as in the case of Comparative Example 7, a laminate including an alkali-free glass plate and a polyimide film having a thickness of 20 μm, except that Comparative Example 9 used vinyl trimethoxysilane (hereinafter may be referred to as "VS") instead of γ-GPS. As a result of observation of the obtained laminate, the polyimide film was almost entirely peeled from the alkali-free glass plate, so that only a polyimide film having large asperities and being wavy was obtained. Thus, Comparative Example 9 did not measure a film characteristic of the polyimide film. Table 3 shows results of evaluation of the polyimide film.

Comparative Example 10

The surface control agent-containing alkoxysilane-modified polyamic acid solution obtained in Comparative Example 9 was cast on an alkali-free glass plate (Eagle XG manufactured by Corning Incorporated), having a square shape of 150 mm in side and 0.7 mm in thickness, by use of a bar coater so as to have a thickness of 20 μm after drying. Then, the cast alkoxysilane-modified polyamic acid solution was dried in a hot air oven at 150° C. for 30 minutes. Thereafter, the alkoxysilane-modified polyamic acid solution was heated from 20° C. to 450° C. at a rate of 4° C./min in a nitrogen atmosphere and heated at 450° C. for 10 minutes, so that a laminate including the alkali-free glass plate and a polyimide film having a thickness of 20 μm was obtained. As a result of observation of the obtained laminate, the polyimide film was almost entirely peeled from the alkali-free glass plate, so that only a polyimide film having large asperities and being wavy was obtained. Thus, Comparative Example 9 did not measure a film characteristic of the polyimide film. Table 3 shows results of evaluation of the polyimide film.

Comparative Example 11

Comparative Example 11 obtained, as in the case of Example 29, a laminate including an alkali-free glass plate and a polyimide film having a thickness of 20 μm, except that Comparative Example 11 added no surface control agent. As a result of observation of the obtained laminate, no bubble and no lift were observed between the polyimide film and the alkali-free glass plate, so that the polyimide film did not spontaneously peel off the alkali-free glass plate during heating. Note, however, that the polyimide film had, on an entire surface thereof, visually confirmable asperities due to nonuniformity in thickness. This made it impossible to obtain a polyimide film having a measurable film characteristic. Table 3 shows results of evaluation of the polyimide film.

TABLE 1

| | | | Surface control agent | | Total number of moles of tetracarboxylic dianhydride/ total number of moles of diamine | Alkoxysilane compound | |
|---|---|---|---|---|---|---|---|
| | Main solvent | Viscosity | Type | Addition Amount (part by weight) | | Type | Addition Amount (part by weight) |
| Example 1 | NMP | 7200 | LF-1980 | 0.01 | 0.995 | γ-APS | 0.05 |
| Example 2 | NMP | 7200 | LF-1980 | 0.01 | 0.995 | γ-APS | 0.05 |
| Example 3 | NMP | 5000 | LF-1980 | 0.01 | 0.995 | γ-APS | 0.05 |
| Example 4 | NMP | 3000 | LF-1980 | 0.01 | 0.995 | γ-APS | 0.05 |
| Example 5 | NMP | 7200 | LF-1980 | 0.005 | 0.995 | γ-APS | 0.05 |
| Example 6 | NMP | 7200 | LF-1985 | 0.01 | 0.995 | γ-APS | 0.05 |
| Example 7 | NMP | 7200 | LF-1985 | 0.005 | 0.995 | γ-APS | 0.05 |
| Example 8 | NMP | 7200 | BYK-3440 | 0.01 | 0.995 | γ-APS | 0.05 |
| Example 9 | NMP | 7200 | BYK-3440 | 0.01 | 0.995 | γ-APS | 0.05 |
| Example 10 | NMP | 5000 | BYK-3440 | 0.01 | 0.995 | γ-APS | 0.05 |
| Example 11 | NMP | 3000 | BYK-3440 | 0.01 | 0.995 | γ-APS | 0.05 |
| Example 12 | NMP | 7200 | BYK-3440 | 0.005 | 0.995 | γ-APS | 0.05 |
| Example 13 | NMP | 7200 | BYK-3441 | 0.01 | 0.995 | γ-APS | 0.05 |
| Example 14 | NMP | 7200 | BYK-3441 | 0.005 | 0.995 | γ-APS | 0.05 |
| Example 15 | NMP | 7200 | BYK-350 | 0.01 | 0.995 | γ-APS | 0.05 |
| Example 16 | NMP | 7200 | BYK-361N | 0.01 | 0.995 | γ-APS | 0.05 |
| Example 17 | NMP | 6700 | LF-1980 | 0.01 | 1.05 | γ-APS | 0.05 |

| | Amount of foreign matter (pieces/g) | Thickness (μm) | Peel strength (N/cm) | Surface property | Haze (%) | Coefficient of linear thermal expansion (ppm/° C.) | Drying start temperature (° C.) |
|---|---|---|---|---|---|---|---|
| Example 1 | 15 | 20 | 0.41 | A | 0.9 | 4 | 120 |
| Example 2 | — | 20 | 0.20 | A | 0.9 | 20 | 150 |
| Example 3 | — | 20 | 0.68 | A | 0.8 | 4 | 120 |
| Example 4 | — | 18 | 0.93 | A | 0.8 | 4 | 120 |
| Example 5 | — | 20 | 0.31 | A | 0.8 | 5 | 120 |
| Example 6 | — | 20 | 0.40 | A | 0.8 | 4 | 120 |
| Example 7 | — | 20 | 0.30 | A | 0.8 | 4 | 120 |
| Example 8 | 10 | 20 | 0.31 | A | 0.4 | 6 | 120 |
| Example 9 | — | 20 | 0.15 | A | 0.5 | 20 | 150 |
| Example 10 | — | 18 | 0.62 | A | 0.5 | 5 | 120 |
| Example 11 | — | 19 | 0.78 | A | 0.5 | 6 | 120 |
| Example 12 | — | 20 | 0.30 | A | 0.6 | 6 | 120 |
| Example 13 | — | 20 | 0.32 | A | 0.4 | 5 | 120 |
| Example 14 | — | 20 | 0.30 | A | 0.6 | 5 | 120 |
| Example 15 | — | 20 | 0.30 | A | 1.2 | 5 | 120 |
| Example 16 | — | 20 | 0.30 | A | 0.6 | 4 | 120 |
| Example 17 | — | 20 | 0.30 | A | 0.8 | 6 | 120 |

TABLE 2

| | | | Surface control agent | | Total number of moles of tetracarboxylic dianhydride/ total number of moles of diamine | Alkoxysilane compound | |
|---|---|---|---|---|---|---|---|
| | Main solvent | Viscosity | Type | Addition Amount (part by weight) | | Type | Addition Amount (part by weight) |
| Example 18 | NMP | 3000 | BYK-361N | 0.01 | 0.995 | γ-APS | 0.05 |
| Example 19 | NMP | 3300 | BYK-361N | 0.01 | 0.995 | γ-APS | 0.05 |

TABLE 2-continued

| | | | | | | | |
|---|---|---|---|---|---|---|---|
| Example 20 | NMP | 3000 | BYK-361N | 0.02 | 0.995 | γ-APS | 0.05 |
| Example 21 | NMP | 3000 | BYK-361N | 0.02 | 0.995 | γ-APS | 0.05 |
| Example 22 | NMP | 3000 | BYK-361N | 0.02 | 0.995 | γ-APS | 0.05 |
| Example 23 | NMP | 3000 | BYK-361N | 0.02 | 0.995 | γ-APS | 0.05 |
| Example 24 | NMP | 3000 | BYK-361N | 0.02 | 0.995 | γ-APS | 0.05 |
| Example 25 | NMP | 3000 | BYK-361N | 0.05 | 0.995 | γ-APS | 0.05 |
| Example 26 | NMP | 3000 | BYK-361N | 0.05 | 0.995 | γ-APS | 0.05 |
| Example 27 | NMP | 3000 | BYK-361N | 0.05 | 0.995 | γ-APS | 0.05 |
| Example 28 | NMP | 3000 | BYK-361N | 0.05 | 0.995 | γ-APS | 0.05 |
| Example 29 | DMI | 7000 | LF-1980 | 0.01 | 0.990 | γ-APS | 0.05 |

| | Amount of foreign matter (pieces/g) | Thickness (μm) | Peel strength (N/cm) | Surface property | Haze (%) | Coefficient of linear thermal expansion (ppm/°C.) | Drying start temperature (°C.) |
|---|---|---|---|---|---|---|---|
| Example 18 | — | 20 | 0.30 | A | 0.4 | 5 | 120 |
| Example 19 | 1150 | 20 | 0.30 | A | 0.4 | 5 | 120 |
| Example 20 | — | 20 | 0.24 | A | 0.4 | 5 | 120 |
| Example 21 | 1150 | 20 | 0.28 | A | 0.4 | 5 | 120 |
| Example 22 | 5 | 20 | 0.25 | A | 0.3 | 5 | 120 |
| Example 23 | — | 20 | 0.20 | A | 0.4 | 20 | 150 |
| Example 24 | — | 20 | 0.15 | B | 0.3 | 20 | 150 |
| Example 25 | — | 20 | 0.40 | A | 4.2 | 5 | 120 |
| Example 26 | 5 | 20 | 0.35 | A | 0.5 | 4 | 120 |
| Example 27 | — | 20 | 0.20 | A | 5.2 | 19 | 150 |
| Example 28 | — | 20 | 0.16 | A | 0.5 | 19 | 150 |
| Example 29 | — | 20 | 0.10 | A | 0.5 | 14 | 120 |

TABLE 3

| | Main solvent | Viscosity | Surface control agent Type | Surface control agent Addition Amount (part by weight) | Total number of moles of tetracarboxylic dianhydride/total number of moles of diamine | Alkoxysilane compound Type | Alkoxysilane compound Addition Amount (part by weight) |
|---|---|---|---|---|---|---|---|
| Comparative Example 1 | NMP | 7200 | None | 0 | 0.995 | γ-APS | 0.05 |
| Comparative Example 2 | NMP | 7200 | None | 0 | 0.995 | γ-APS | 0.05 |
| Comparative Example 3 | NMP | 7200 | None | 0 | 0.995 | γ-APS | 0.05 |
| Comparative Example 4 | DMAc | 13600 | None | 0 | 0.997 | None | — |
| Comparative Example 5 | NMP | 7200 | None | 0 | 0.995 | None | — |
| Comparative Example 6 | NMP | 7200 | LF-1980 | 0.01 | 0.995 | None | — |
| Comparative Example 7 | NMP | 3300 | BYK-361N | 0.02 | 0.995 | γ-GPS | 0.05 |
| Comparative Example 8 | NMP | 3300 | BYK-361N | 0.02 | 0.995 | γ-GPS | 0.05 |
| Comparative Example 9 | NMP | 3300 | BYK-361N | 0.02 | 0.995 | VS | 0.05 |
| Comparative Example 10 | NMP | 3300 | BYK-361N | 0.02 | 0.995 | VS | 0.05 |
| Comparative Example 11 | DMI | 7000 | None | 0 | 0.990 | γ-APS | 0.05 |

| | Amount of foreign matter (pieces/g) | Tickness (μm) | Peel strength (N/cm) | Surface property | Haze (%) | Coefficient of linear thermal expansion (ppm/°C.) | Drying start temperature (°C.) |
|---|---|---|---|---|---|---|---|
| Comparative Example 1 | 15 | 20 | — | D | — | — | 120 |
| Comparative Example 2 | — | 20 | 0.20 | B | 0.4 | 5 | 80 |
| Comparative Example 3 | — | 20 | 0.15 | B | 0.4 | 17 | 80 |
| Comparative Example 4 | — | 18 | 0.15 | A | 0.3 | 7 | 80 |

TABLE 3-continued

| | | | | | | | |
|---|---|---|---|---|---|---|---|
| Comparative Example 5 | — | 20 | x | D | — | — | 120 |
| Comparative Example 6 | — | 20 | x | A | — | — | 120 |
| Comparative Example 7 | — | 20 | 0.08 | A | 0.4 | 6 | 120 |
| Comparative Example 8 | — | 20 | 0.07 | A | 0.4 | 22 | 150 |
| Comparative Example 9 | — | 20 | x | D | — | — | 120 |
| Comparative Example 10 | — | 20 | x | D | — | — | 150 |
| Comparative Example 11 | — | 20 | 0.10 | D | — | — | 120 |

According to the polyimide films of Examples 1 through 29, no bubble was generated between a polyimide film and an alkali-free glass plate even in a case where the polyimide film has a thickness of approximately 20 μm. This made it possible to obtain a laminate including the polyimide film and the alkali-free glass plate. In contrast, according to the polyimide films of Comparative Examples 4 through 6, 9, and 10, bubbles were generated between a polyimide film and an alkali-free glass plate in a case where the polyimide film has a thickness of approximately 20 μm. This made it impossible to obtain a laminate including the polyimide film and the alkali-free glass plate. Further, the polyimide film of Comparative Example 7 had a low peel strength and thus was easily peeled from the glass plate.

Furthermore, the polyimide films of Examples 1 through 29 neither curled nor warped after having been peeled from alkali-free glass. This is because these polyimide films each had a coefficient of linear thermal expansion of 20 ppm/° C. or less, which is close to a coefficient of linear thermal expansion of the alkali-free glass. Meanwhile, the polyimide film of Comparative Example 8 had a coefficient of linear thermal expansion of more than 20 ppm/° C.

Since the alkoxysilane-modified polyamic acid solutions of Examples 1 through 29 each contained a surface control agent, it was possible to obtain a polyimide film having (i) a higher peel strength than a polyimide film containing no surface control agent and (ii) a sufficiently highly smooth surface having no visually confirmable asperities. Further, though the alkoxysilane-modified polyamic acid solutions of Examples 1 through 29 each contained a surface control agent, it was possible to obtain a polyimide film (i) having a haze of 1.5% or less and (ii) being clear. Meanwhile, the polyimide films of Comparative Examples 1 and 11 had visually confirmable asperities on entire surfaces thereof.

Furthermore, the alkoxysilane-modified polyamic acid solutions of Examples 1 through 29 each made it possible to obtain such a favorable polyimide film as described earlier, though a drying starting temperature was set at 120° C. or higher. Meanwhile, in a case where a drying starting temperature was set at 120° C. or higher, the polyimide films of Comparative Examples 1 and 5 through each had such visually confirmable asperities as described earlier and/or were easily peeled. According to the polyimide films of Comparative Examples 2 through 4, it was necessary to set a drying starting temperature at 80° C. This made a film-forming time longer.

INDUSTRIAL APPLICABILITY

The present invention can be suitably used in, for example, the field of electronic devices such as a flat panel display and electronic paper.

REFERENCE SIGNS LIST

1 Alkoxysilane-modified polyamic acid solution
2 Inorganic substrate
3 Convection current
4 Polyimide film
5 Surface control agent

The invention claimed is:

1. An alkoxysilane-modified polyamic acid solution comprising:
   an alkoxysilane-modified polyamic acid; and
   a surface control agent,
   the alkoxysilane-modified polyamic acid solution having a viscosity of 1,200 mPa·s to 20,000 mPa·s,
   the alkoxysilane-modified polyamic acid being obtained by reacting, in a polyamic acid solution, a polyamic acid with an alkoxysilane compound containing an amino group, and
   the polyamic acid being obtained by reacting a diamine with a tetracarboxylic dianhydride,
   wherein the surface control agent is an acrylic compound
   wherein the alkoxysilane compound is added in an amount of 0.01 parts by weight to 0.50 parts by weight in a case where the polyamic acid is contained in the alkoxysilane-modified polyamic acid solution in an amount of 100 parts by weight, and
   wherein the tetracarboxylic dianhydride reacts with the diamine in a molar ratio of 0.980 or more and less than 1.000 with respect to the diamine, the molar ratio being obtained by dividing a total number of moles of the tetracarboxylic dianhydride by a total number of moles of the diamine.

2. The alkoxysilane-modified polyamic acid solution as set forth in claim 1, wherein the surface control agent is added in an amount of 0.0001 parts by weight or more and 0.1 parts by weight or less with respect to 100 parts by weight of the alkoxysilane-modified polyamic acid.

3. The alkoxysilane-modified polyamic acid solution as set forth in claim 1, wherein the alkoxysilane-modified polyamic acid solution contains, in an amount of 100 pieces/g or smaller, foreign matter having a size of 0.5 μm or more.

4. The alkoxysilane-modified polyamic acid solution as set forth in claim 1, wherein:
   the tetracarboxylic dianhydride is 3,3',4,4'-biphenyltetracarboxylic dianhydride; and
   the diamine is a diamine represented by the following formula (1):

[Chem. 1]

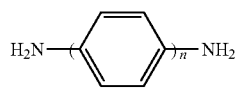

(1)

wherein n is any integer of 1 to 3.

5. The alkoxysilane-modified polyamic acid solution as set forth in claim 1, wherein the alkoxysilane-modified polyamic acid solution contains an amide solvent as a main solvent.

6. The alkoxysilane-modified polyamic acid solution as set forth in claim 5, wherein the amide solvent is N-methyl-2-pyrolidone.

7. A laminate comprising:
a polyimide film; and
an inorganic substrate,
the laminate being obtained by the steps of:
casting, on the inorganic substrate, an alkoxysilane-modified polyamic acid solution recited in of claim 1; and
heating and imidizing the alkoxysilane-modified polyamic acid solution.

8. A laminate comprising:
a polyimide film obtained from an alkoxysilane-modified polyamic acid solution recited in claim 1; and
an inorganic substrate to which the polyimide film is laminated,
the polyimide film having a coefficient of linear thermal expansion of 20 ppm/° C. or less.

9. A flexible device comprising:
a polyimide film obtained from an alkoxysilane-modified polyamic acid solution recited in claim 1; and
an electronic element provided on the polyimide film.

10. A method for producing a laminate,
the laminate including:
a polyimide film; and
an inorganic substrate,
the method comprising the steps of:
casting, on the inorganic substrate, an alkoxysilane-modified polyamic acid solution recited in claim 1; and
subjecting the alkoxysilane-modified polyamic acid solution to thermal imidization,
the thermal imidization being started at 100° C. to 150° C.

11. A method for producing a polyimide film,
the method comprising the step of:
peeling the polyimide film from an inorganic substrate of a laminate obtained by a method recited in claim 10.

* * * * *